US010794783B2

(12) United States Patent
Pagani et al.

(10) Patent No.: US 10,794,783 B2
(45) Date of Patent: Oct. 6, 2020

(54) PRESSURE SENSING DEVICE WITH CAVITY AND RELATED METHODS

(71) Applicant: STMicroelectronics S.r.l., Agrate Brianza (IT)

(72) Inventors: Alberto Pagani, Nova Milanese (IT); Federico Giovanni Ziglioli, pozzo d'adda (IT); Bruno Murari, Monza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 195 days.

(21) Appl. No.: 15/914,832

(22) Filed: Mar. 7, 2018

(65) Prior Publication Data

US 2018/0195916 A1    Jul. 12, 2018

Related U.S. Application Data

(63) Continuation of application No. 14/626,153, filed on Feb. 19, 2015, now Pat. No. 9,939,338.

(51) Int. Cl.
*G01L 5/00* (2006.01)
*G01L 1/18* (2006.01)
(Continued)

(52) U.S. Cl.
CPC .......... *G01L 5/0038* (2013.01); *F16B 31/028* (2013.01); *G01L 1/18* (2013.01); *G01L 1/20* (2013.01)

(58) Field of Classification Search
CPC ............... G01N 33/2888; G01N 11/00; G01N 2011/0013; F01M 1/02; F01M 1/16;
(Continued)

(56) References Cited

U.S. PATENT DOCUMENTS 3,945,704 A * 3/1976 Kraus ................. H01R 4/2495
                                                      439/411
4,566,316 A * 1/1986 Takeuchi ................ G01L 23/10
                                                      310/338
(Continued)

FOREIGN PATENT DOCUMENTS

CN       101542257 A      9/2009
CN       103308218 A      9/2013
(Continued)

OTHER PUBLICATIONS

"Materials Selection and Design," ASM Handbook vol. 10, Dec. 1, 1997, 1 page.

(Continued)

*Primary Examiner* — Peter J Macchiarolo
*Assistant Examiner* — Monica S Young
(74) *Attorney, Agent, or Firm* — Slater Matsil, LLP

(57) ABSTRACT

A pressure sensing device may include a body configured to distribute a load applied between first and second parts positioned one against the other, and a pressure sensor carried by the body. The pressure sensor may include a support body, and an IC die mounted with the support body and defining a cavity. The IC die may include pressure sensing circuitry responsive to bending associated with the cavity, and an IC interface coupled to the pressure sensing circuitry.

29 Claims, 27 Drawing Sheets

(51) Int. Cl.
*G01L 1/20* (2006.01)
*F16B 31/02* (2006.01)

(58) Field of Classification Search
CPC .... F01M 11/0004; F01M 11/03; F01M 11/10; F01M 2250/00; F16N 2250/08; F16N 2250/30; F16N 2270/52
USPC .......................................................... 73/761
See application file for complete search history.

(56) References Cited

U.S. PATENT DOCUMENTS

| | | | | |
|---|---|---|---|---|
| 4,996,873 | A * | 3/1991 | Takeuchi | G01L 23/10 73/114.21 |
| 7,662,782 | B2 | 2/2010 | Szardenings et al. | |
| 9,483,674 | B1 * | 11/2016 | Fink | G06K 7/10366 |
| 2004/0153270 | A1 | 8/2004 | Yamashita et al. | |
| 2005/0284231 | A1 * | 12/2005 | Zimmerman | G01L 1/14 73/761 |
| 2008/0016683 | A1 | 1/2008 | Brida et al. | |
| 2008/0315333 | A1 | 12/2008 | Combi et al. | |
| 2009/0033467 | A1 | 2/2009 | Finocchiaro et al. | |
| 2009/0235753 | A1 | 9/2009 | Yamamoto et al. | |
| 2010/0005862 | A1 * | 1/2010 | Davey | G01M 3/025 73/46 |
| 2011/0094314 | A1 * | 4/2011 | Dekker | G01L 19/0038 73/862.045 |
| 2012/0264250 | A1 | 10/2012 | Graham et al. | |
| 2013/0049952 | A1 * | 2/2013 | Schnare | F16B 31/02 340/539.1 |
| 2013/0050228 | A1 * | 2/2013 | Petersen | H01L 23/053 345/501 |
| 2013/0234264 | A1 | 9/2013 | Suganumata | |
| 2013/0342186 | A1 * | 12/2013 | Pagani | G01M 5/0083 324/71.1 |
| 2014/0083206 | A1 * | 3/2014 | Pagani | G01L 1/005 73/862.68 |
| 2014/0129158 | A1 * | 5/2014 | Shea | G01L 5/243 702/57 |
| 2014/0182390 | A1 * | 7/2014 | Pagani | G01L 1/18 73/786 |
| 2016/0245709 | A1 | 8/2016 | Pagani et al. | |
| 2018/0067003 | A1 * | 3/2018 | Michiwaki | G01L 5/243 |
| 2019/0226886 | A1 * | 7/2019 | Bromley | G01D 11/245 |

FOREIGN PATENT DOCUMENTS

| | | | |
|---|---|---|---|
| CN | 103392126 A | 11/2013 | |
| CN | 103534195 A | 1/2014 | |
| CN | 205209660 U | 5/2016 | |
| WO | 2012084295 A1 | 6/2012 | |
| WO | WO-2013174946 A1 * | 11/2013 | ............. G01K 17/00 |

OTHER PUBLICATIONS

Barlian, A. Alvin et al., "Review: Semiconductor Piezoresistance for Microsystems," Proceedings of the IEEE, vol. 97, No. 3, Mar. 2009, 40 pages.

Kuo, Hung-I et al., "Smart-Cut Piesoresistive Strain Sensors for High Temperature Applications," IEEE Sensors 2009 Conference, 3 pages.

Yongguang, Wei, Winter Wide, "Modern Sensing Technology," 2001, 12 pages.

* cited by examiner

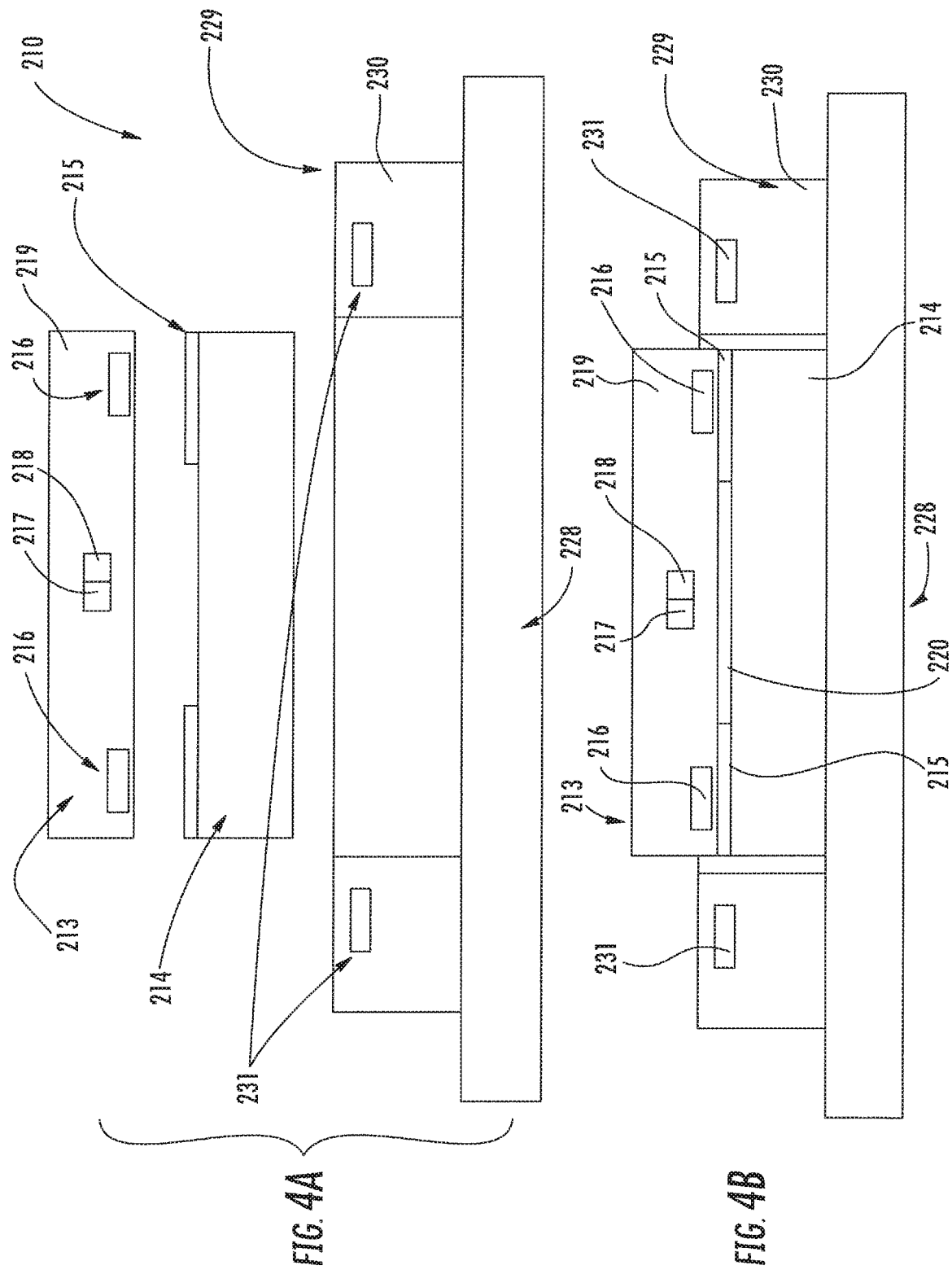

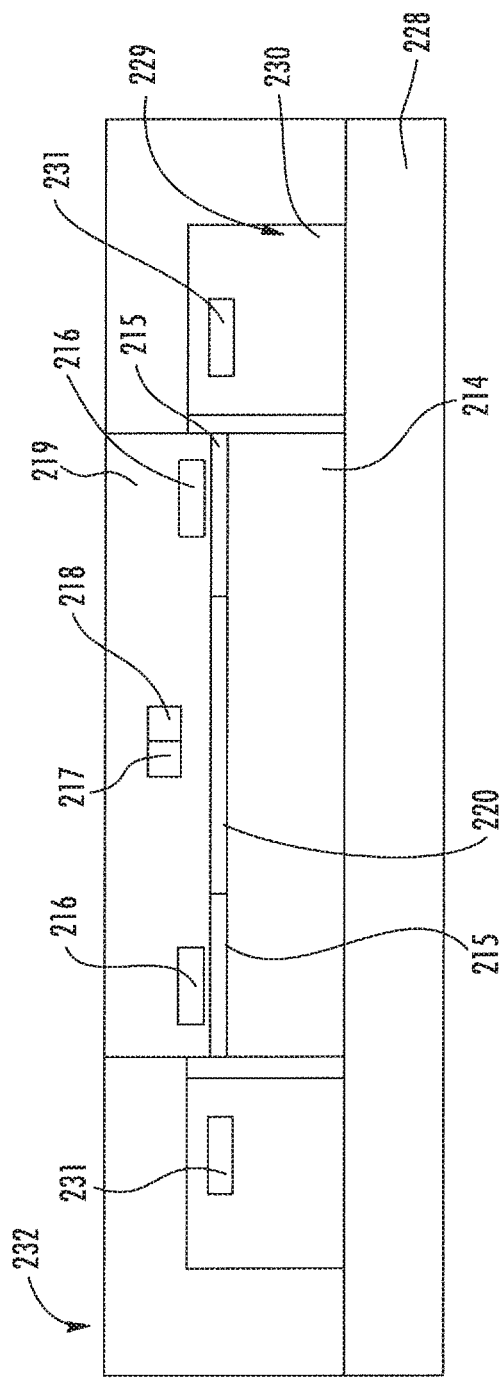
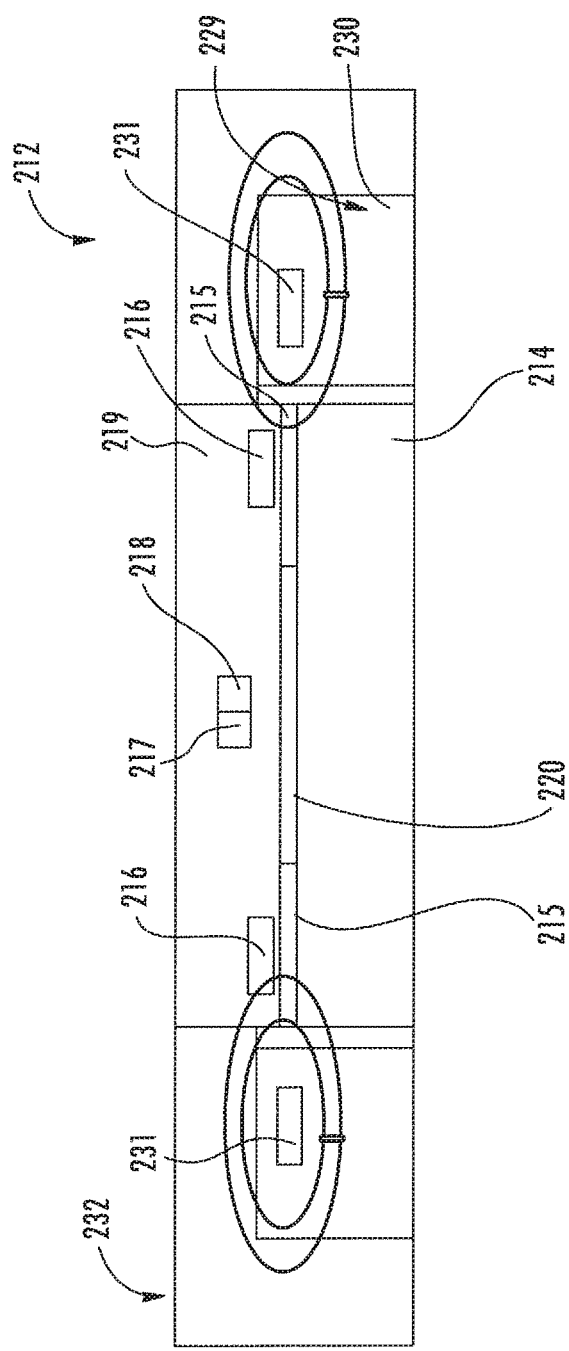

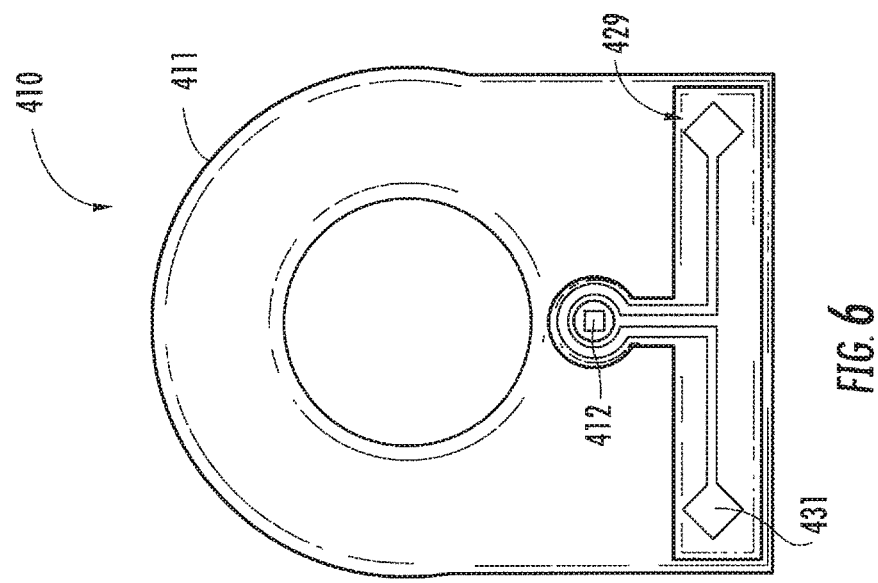
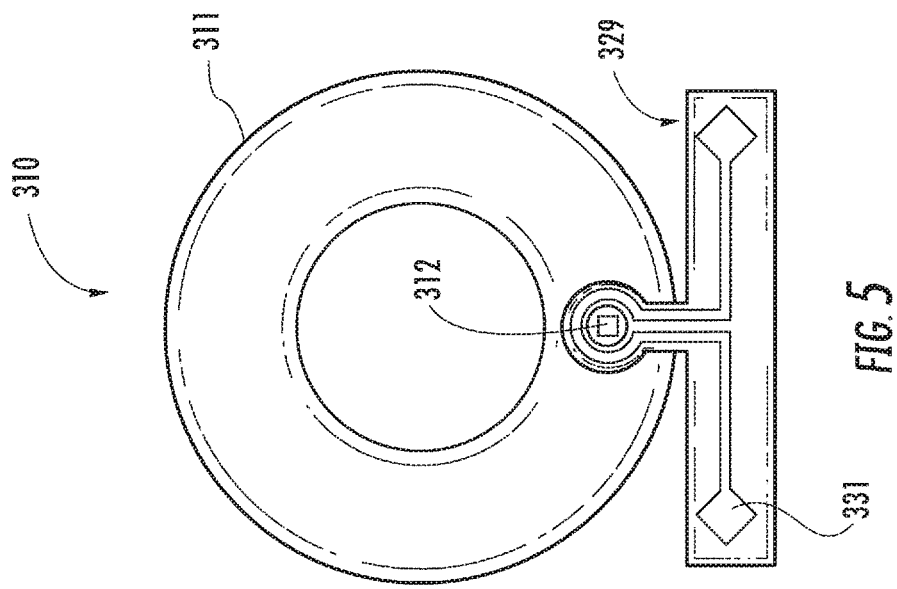

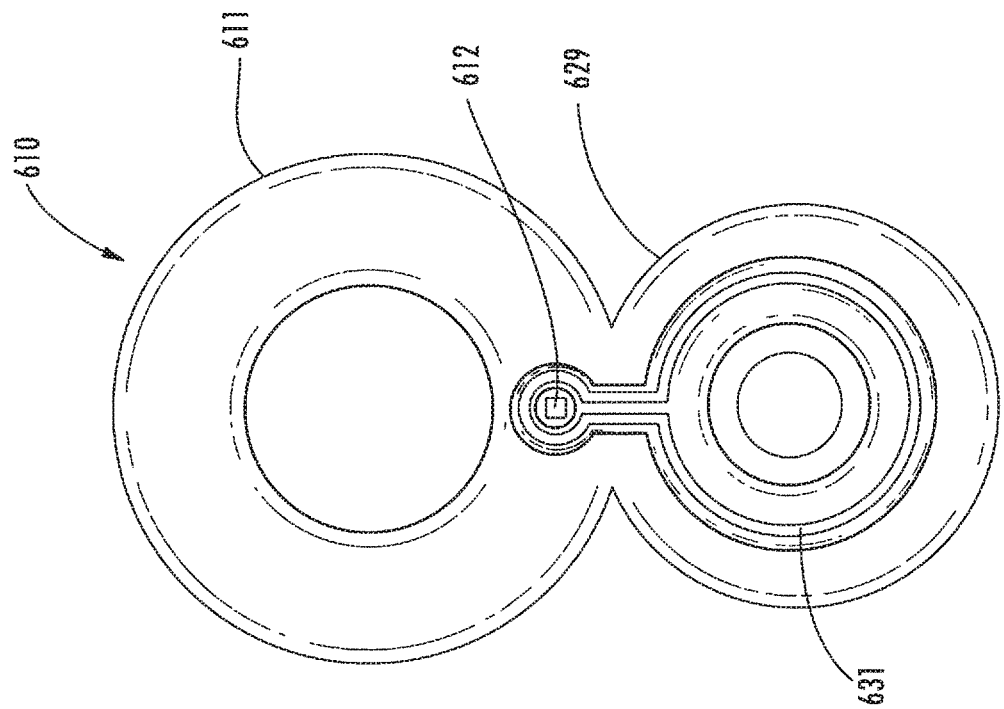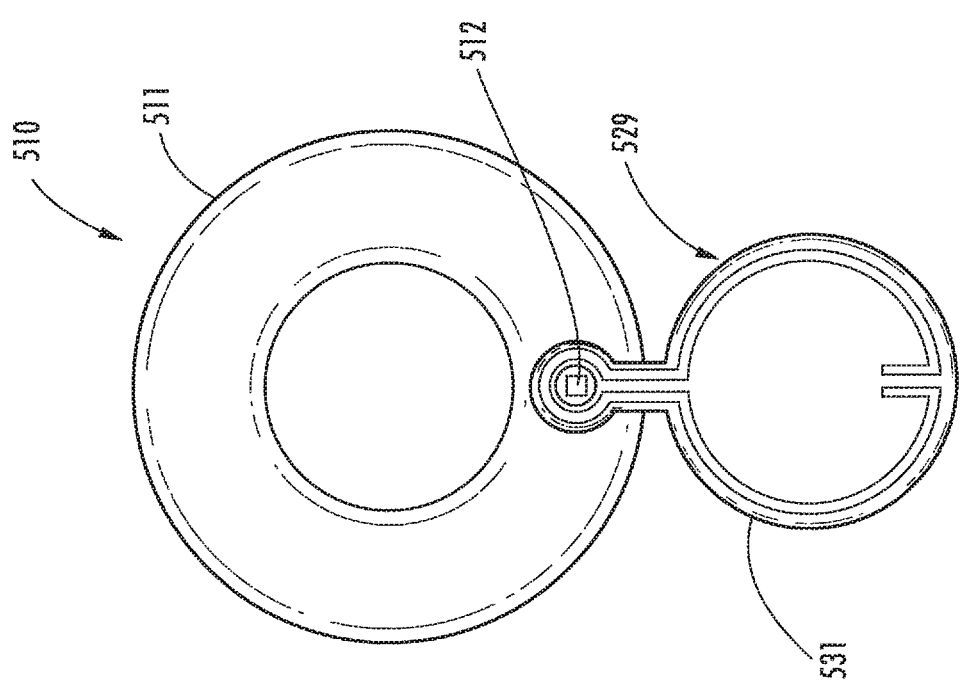

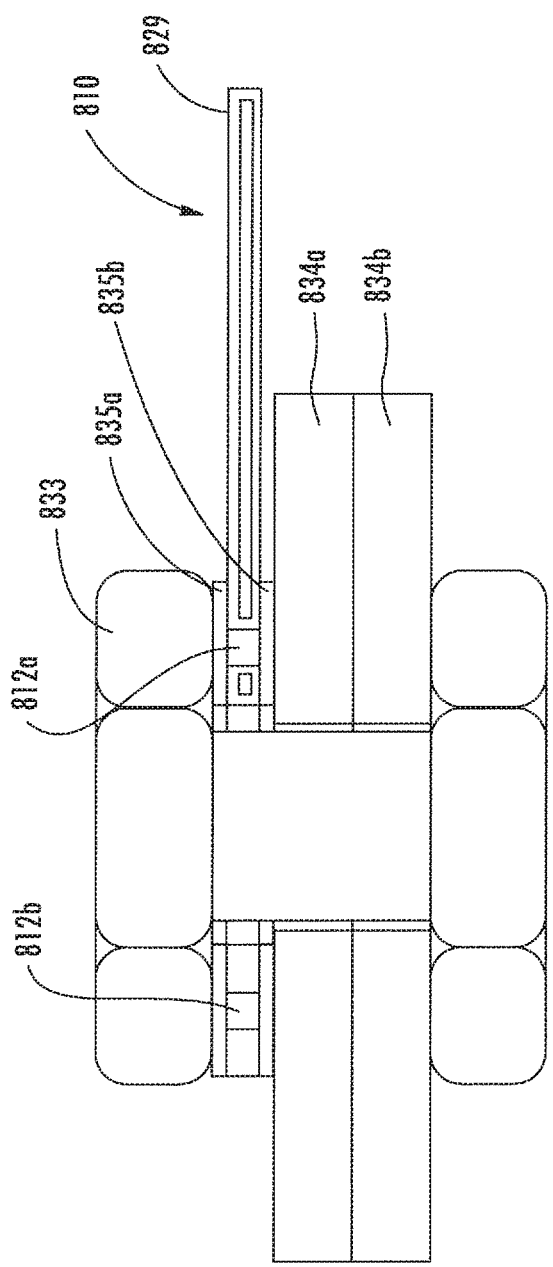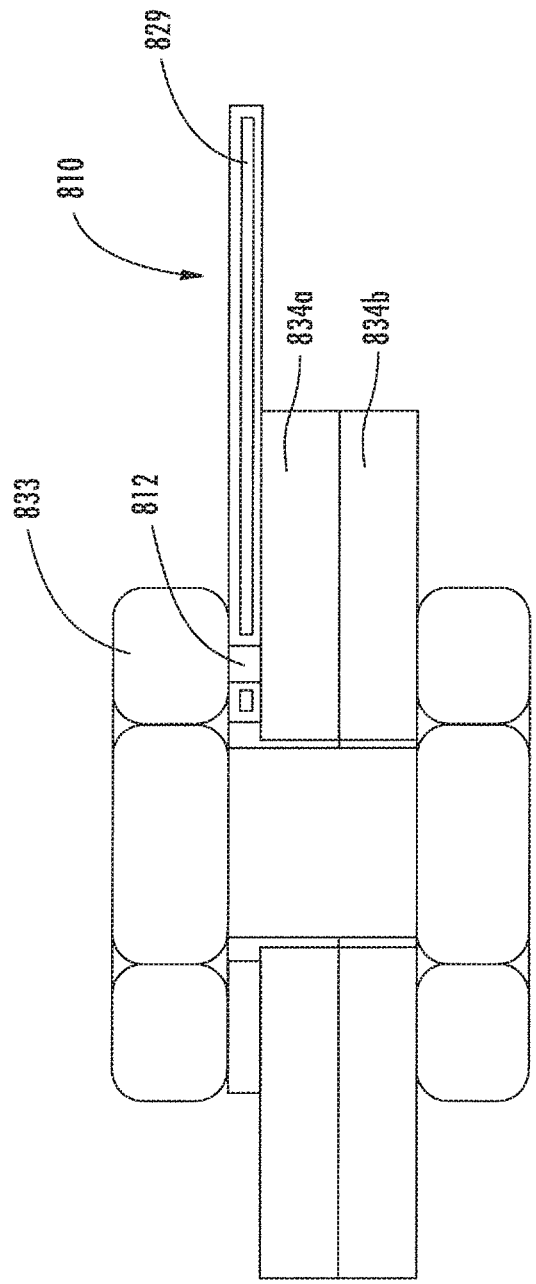

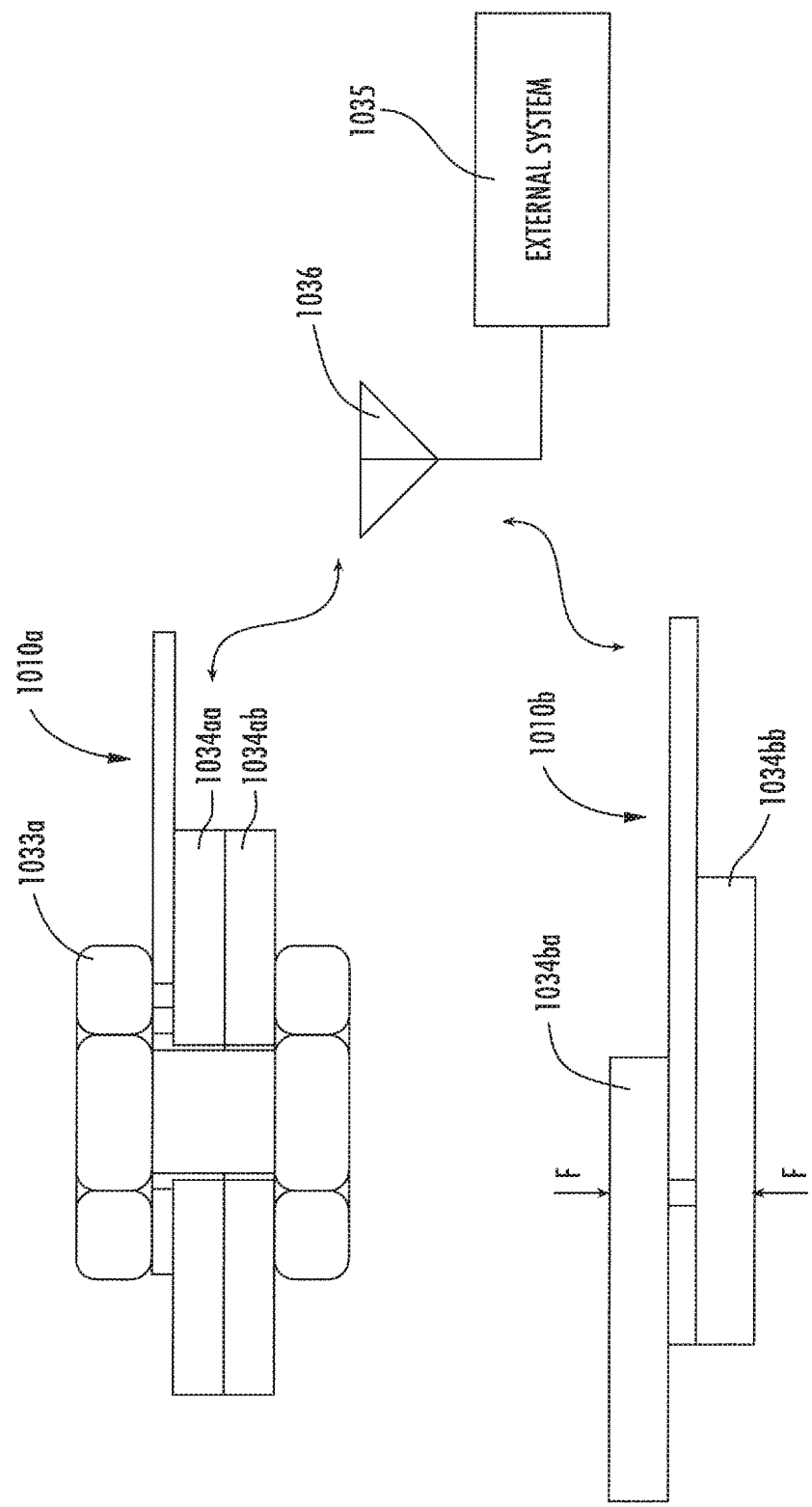

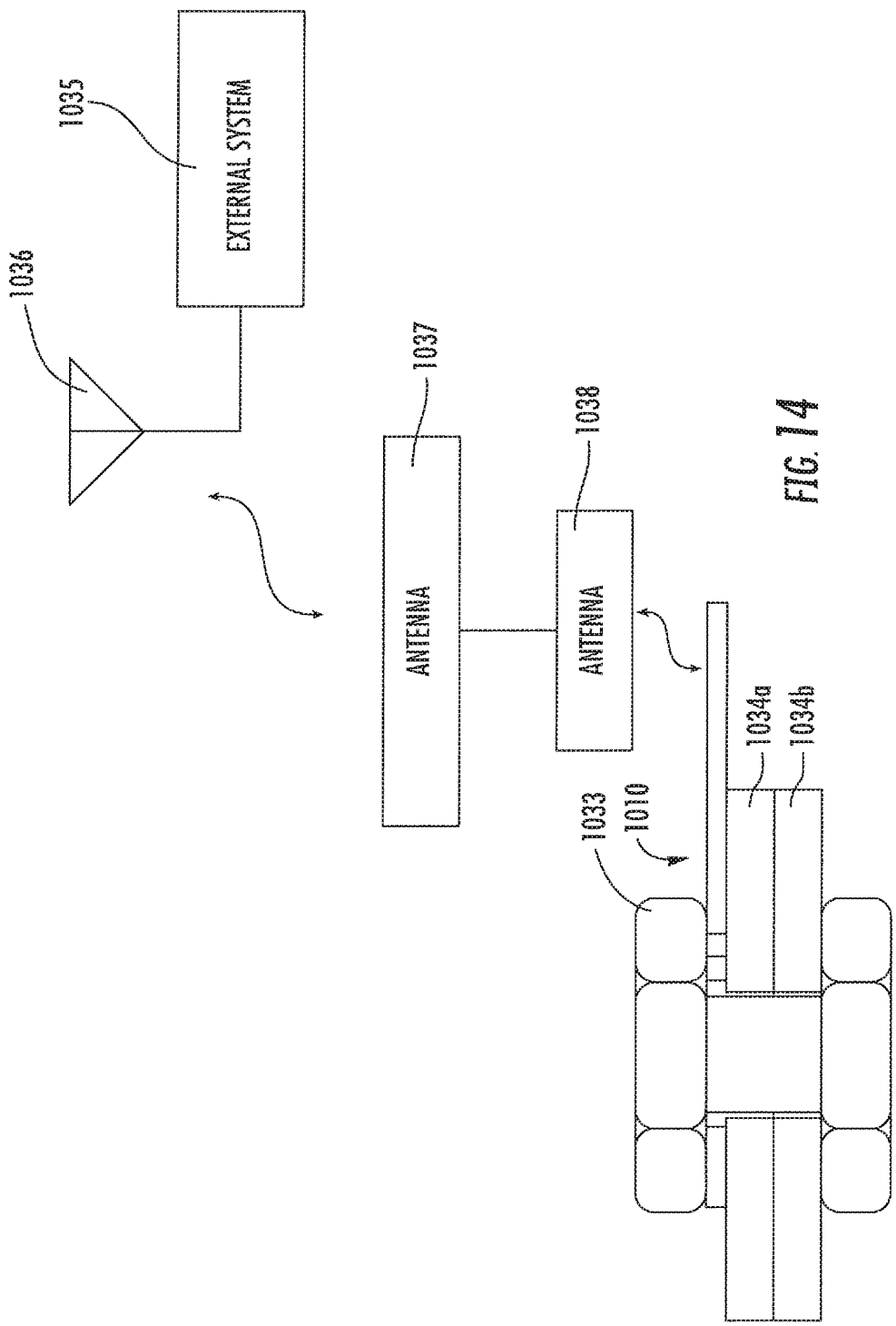

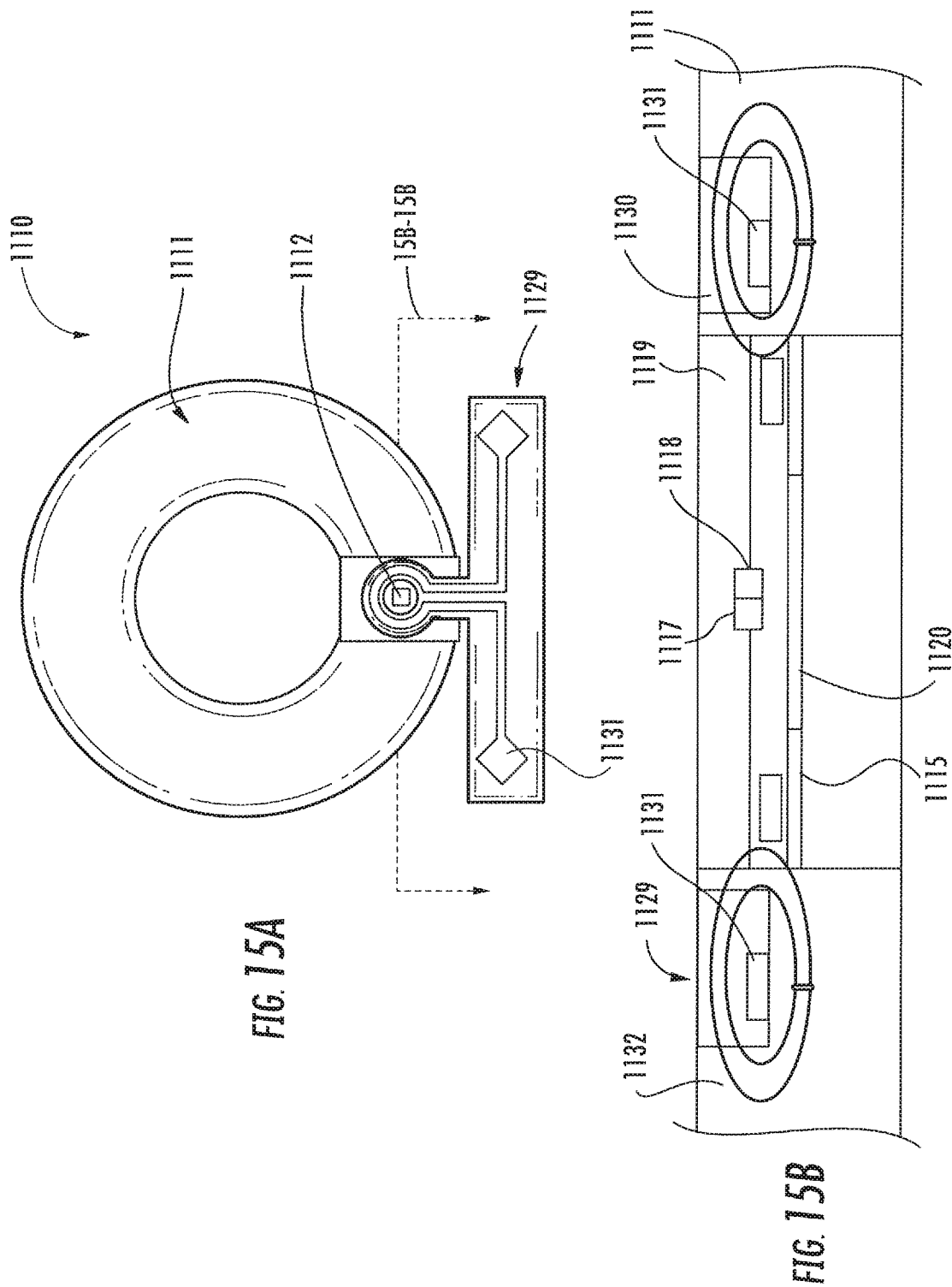

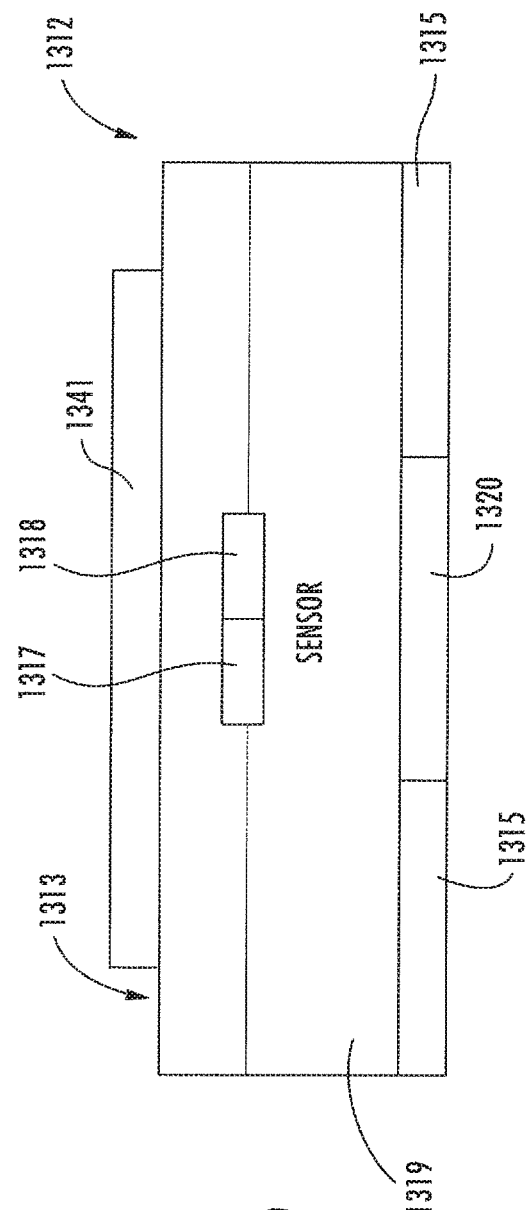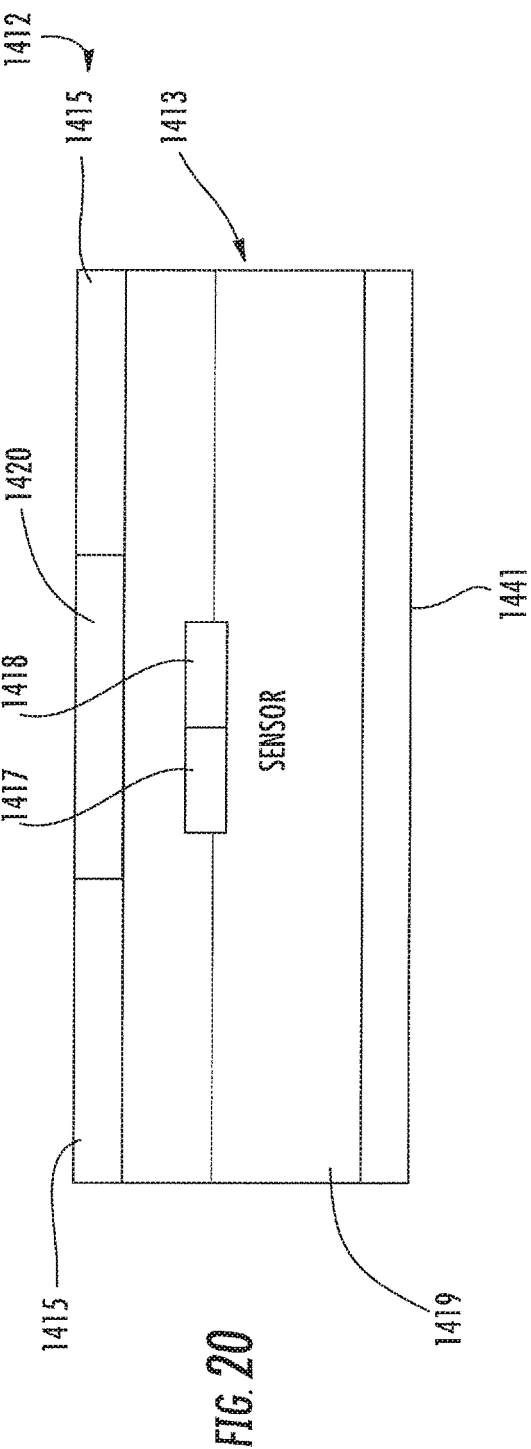

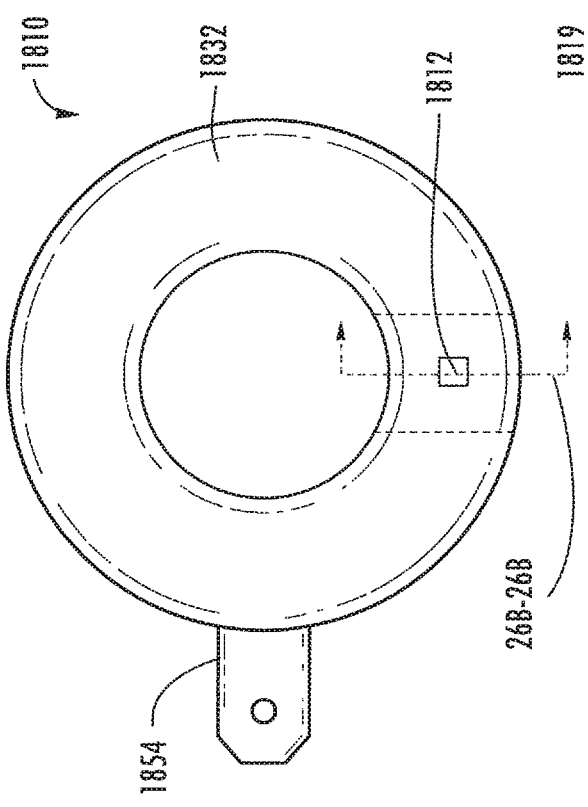
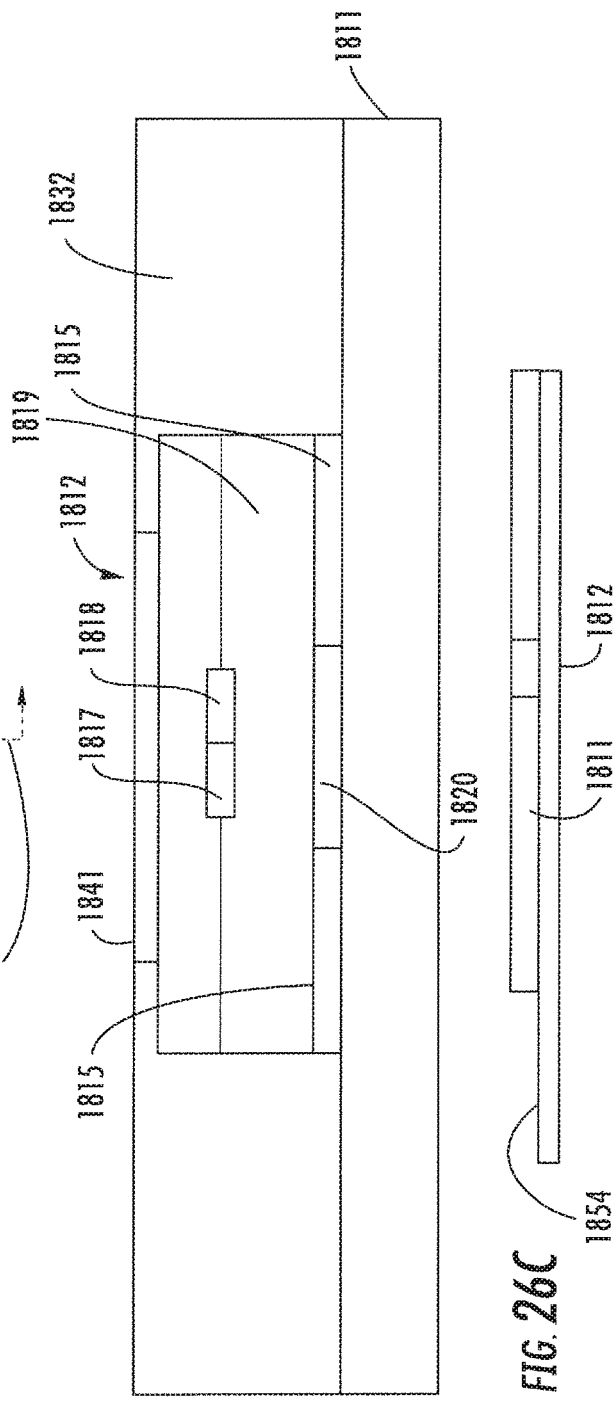
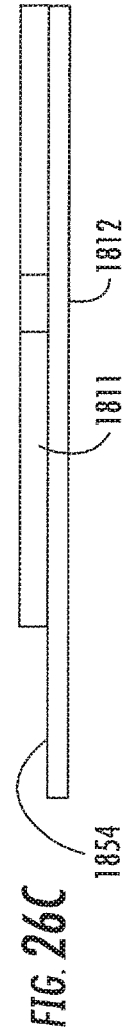

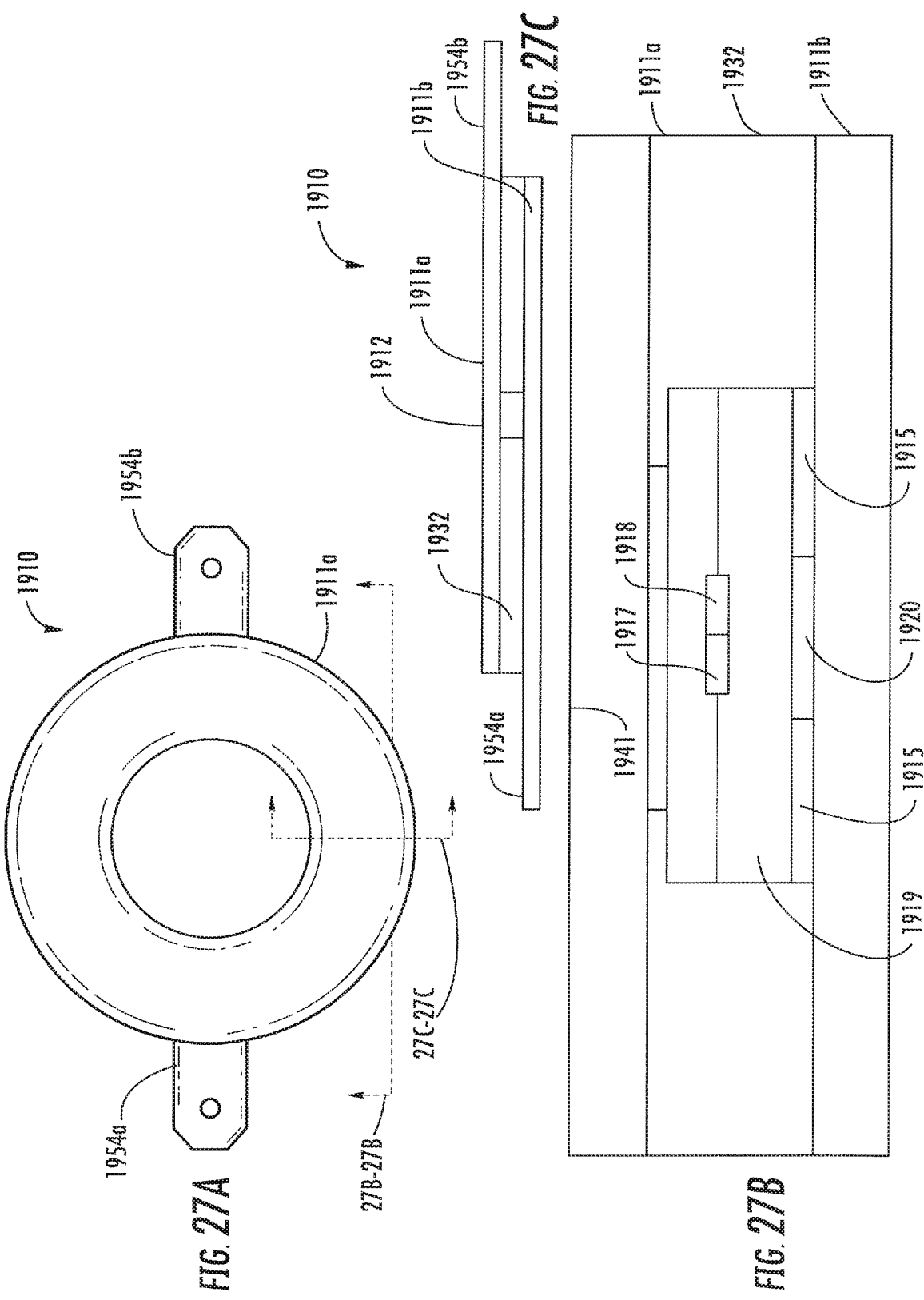

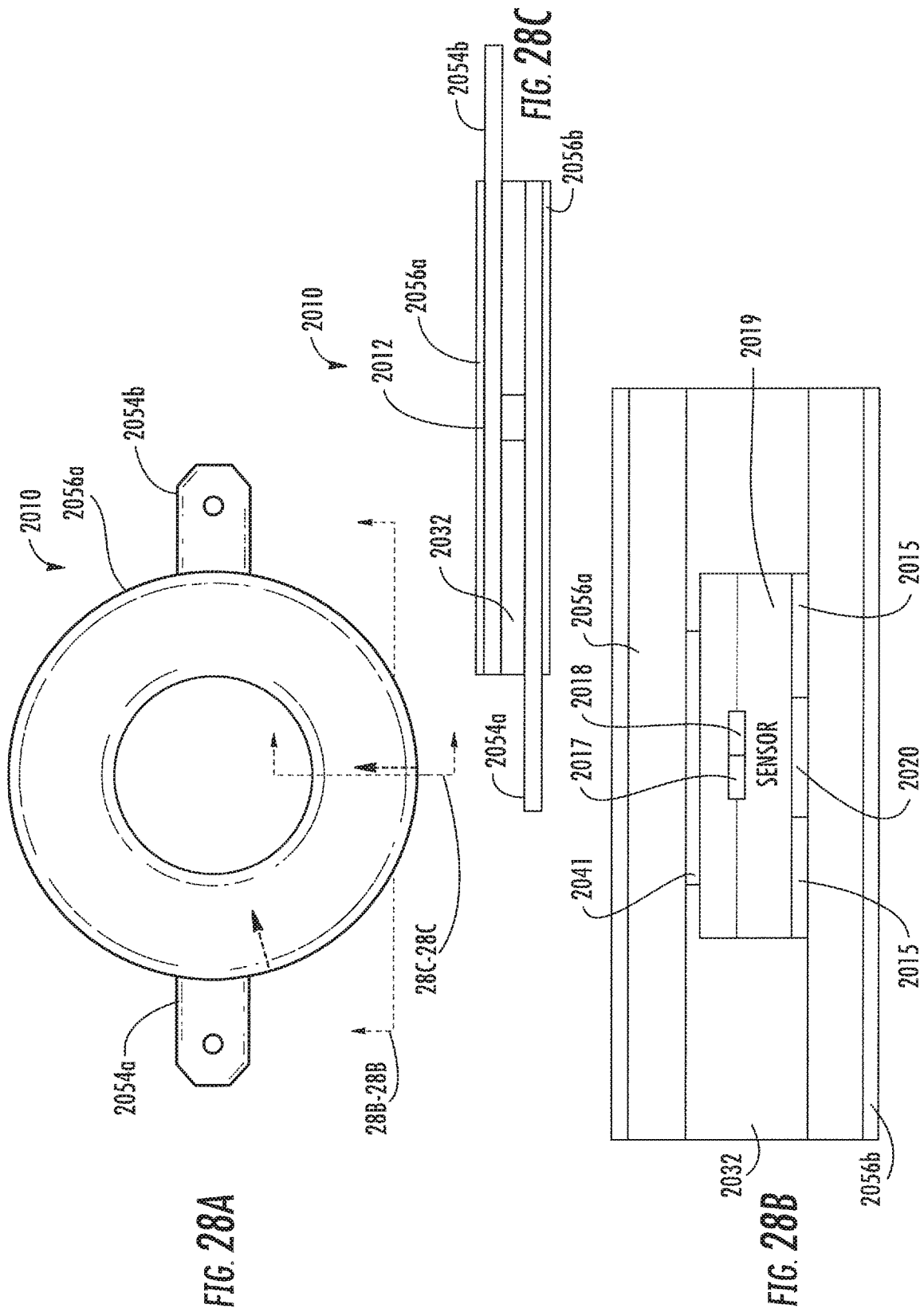

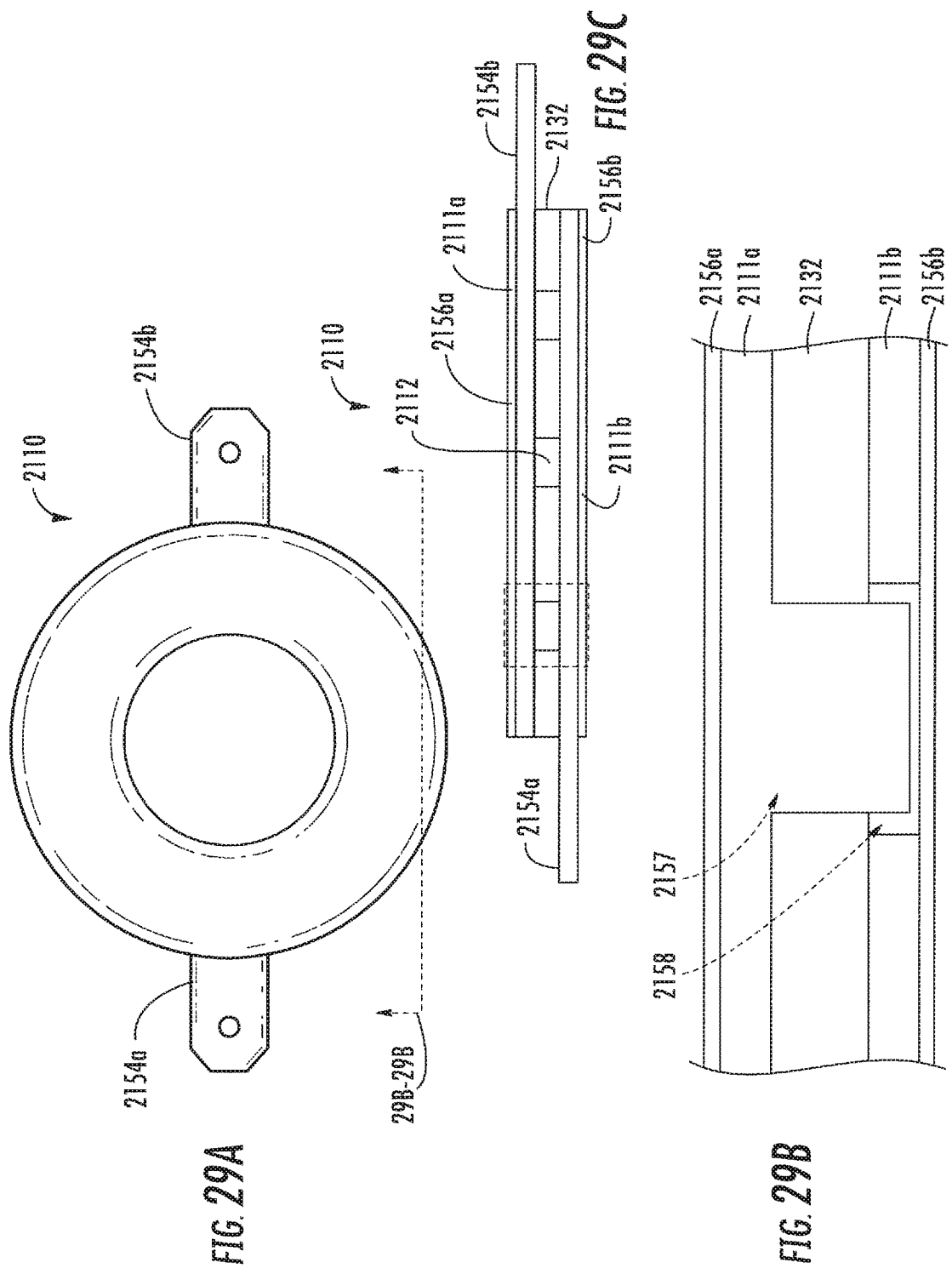

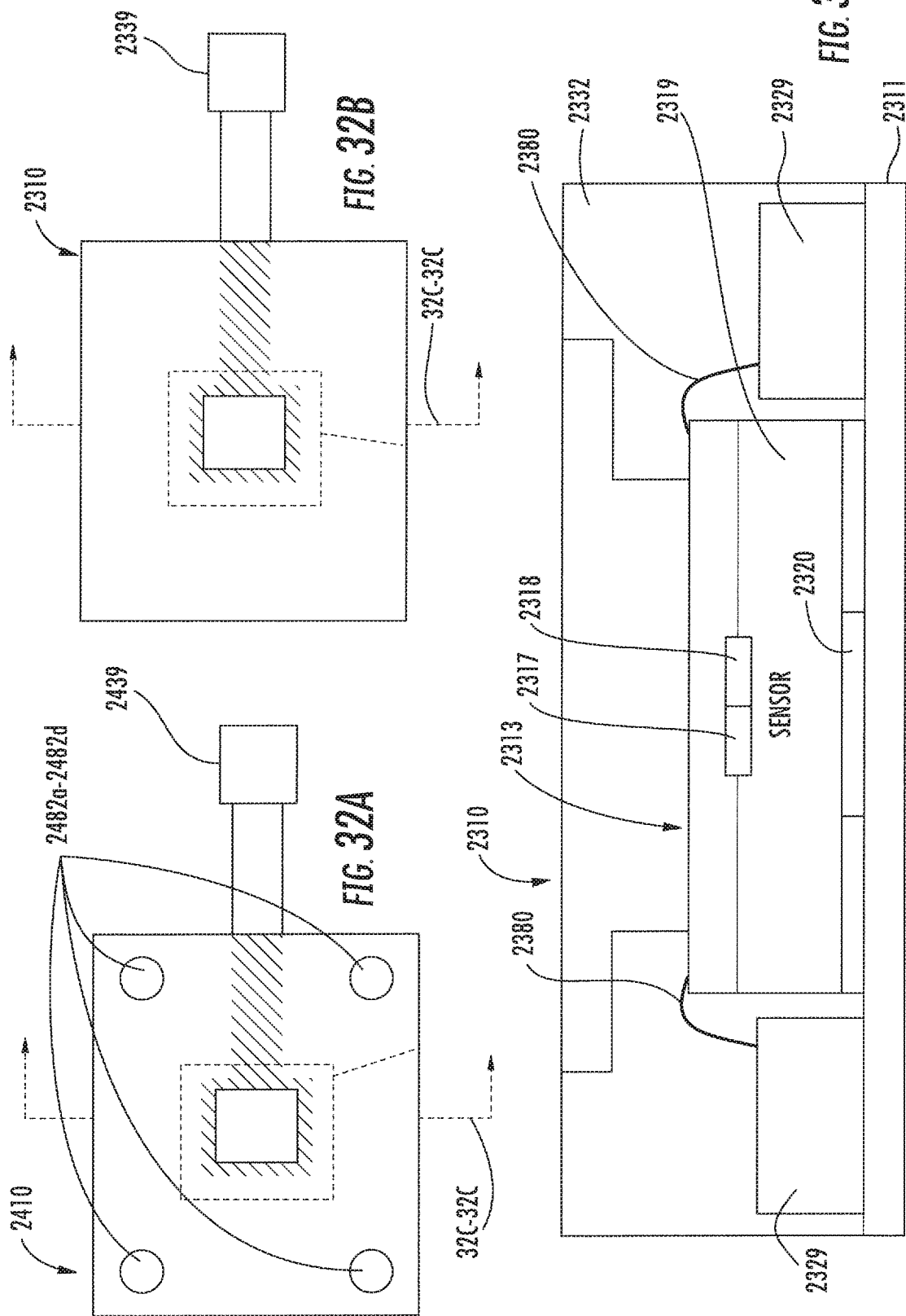

PRESSURE SENSING DEVICE WITH CAVITY AND RELATED METHODS

CROSS-REFERENCE TO RELATED APPLICATIONS

This application is a continuation of U.S. application Ser. No. 14/626,153, filed on Feb. 19, 2015, which application is hereby incorporated herein by reference.

TECHNICAL FIELD

The present disclosure relates to the field of electronic devices, and, more particularly, to integrated circuits and related methods.

BACKGROUND

In solid structures, particularly in load-bearing structures of, for example, bridges, buildings, tunnels, railways, containment walls, dams, embankments, pipelines and underground structures of metropolitan transport lines, and so on, it may be important to monitor, in many points, significant parameters, like, for example, pressure, temperature and mechanical stresses. Such monitoring is carried out periodically or continuously, and is useful both at the initial stage and during the lifetime of the structure.

For this purpose, an approach in this field includes the application of electronic monitoring devices based on electronic sensors, capable of providing good performance at low cost. Usually, such devices are applied onto the surface of the structures to be monitored, or inside recesses already in the structure and accessible from the outside.

Such devices are not able to exhaustively detect the parameters within the structure to be monitored, which it may be useful to know to evaluate the quality of the structure, its safety, its ageing, its reaction to variable atmospheric conditions, and so on. Moreover, such devices can only typically be applied after the structure has been built, and not while it is being built. Therefore, they may be unable to evaluate possible initial or internal defects.

SUMMARY

Generally speaking, a pressure sensing device may include a body configured to distribute a load applied between first and second parts positioned one against the other, and at least one pressure sensor carried by the body. The at least one pressure sensor may include a support body, and an integrated circuit (IC) die mounted with the support body and defining a cavity therebetween. The IC die may include pressure sensing circuitry responsive to bending associated with the cavity, and an IC interface coupled to the pressure sensing circuitry.

In some embodiments, the two parts may be joined by a threaded fastener, and the at least one pressure sensor is carried by a ring-shaped body. In other embodiments, the two parts may be at least partially overlapped.

The IC interface may include a transceiver circuit, and electrically conductive antenna traces coupled thereto. The at least one pressure sensor may comprise at least one substrate adjacent the IC die and comprising additional electrically conductive antenna traces coupled to the transceiver circuit. The pressure sensing device may further include an arm extension extending outwardly from the body, and the electrically conductive antenna traces may be carried by the arm extension.

Additionally, the additional electrically conductive antenna traces may surround the IC die. The at least one substrate may be canted with respect to the IC die. The at least one pressure sensor may comprise a bonding layer between the IC die and the support body. For example, the support body may comprise at least one of a ceramic material, a glass material, and a silicon material.

In some embodiments, the body may have at least one slot therein, and the at least one pressure sensor may be in the at least one slot. The pressure sensing device may comprise encapsulation material in the at least one slot and surrounding the at least one pressure sensor. The body may comprise encapsulation material.

Another embodiment is also directed to a pressure sensing device. The pressure sensing device may include a body configured to distribute a load applied between first and second parts positioned one against the other, and at least one pressure sensor carried by the body. The at least one pressure sensor may include an IC die mounted with the body and defining a cavity with adjacent portions of the body. The IC die may include pressure sensing circuitry responsive to bending associated with the cavity, and an IC interface coupled to the pressure sensing circuitry. More specifically, the at least one pressure sensor may comprise at least one spacer layer adjacent the IC die.

Another aspect is directed to a method of making a pressure sensing device. The method may include forming a body to distribute a load applied between first and second parts positioned one against the other, and coupling at least one pressure sensor carried by the body. The at least one pressure sensor may include a support body, and an IC die mounted with the support body and defining a cavity therebetween. The IC die may include pressure sensing circuitry responsive to bending associated with the cavity, and an IC interface coupled to the pressure sensing circuitry.

Yet another aspect is directed to a method of making another embodiment of the pressure sensing device. The method may include forming a body configured to distribute a load applied between first and second parts positioned one against the other, and coupling at least one pressure sensor carried by the body. The at least one sensor may include an IC die mounted with the body and defining a cavity with adjacent portions of the body. The IC die may include pressure sensing circuitry responsive to bending associated with the cavity, and an IC interface coupled to the pressure sensing circuitry.

BRIEF DESCRIPTION OF THE DRAWINGS

FIGS. 4A-4D are schematic diagrams of a cross-section view of another embodiment of the pressure sensing device during manufacture.

FIGS. 5-9 are schematic diagrams of a top plan view of other embodiments of the pressure sensing device.

FIGS. 10-14 are schematic diagrams of a side elevation plan view of other embodiments of the pressure sensing device.

FIG. 15A is a schematic diagram of a top plan view of another embodiment of the pressure sensing device.

FIG. 15B is a schematic diagram of a cross-section view of the pressure sensing device of FIG. 15A along line 15B-15B.

FIGS. 19 and 20 are schematic diagrams of a cross-section view of other embodiments of the pressure sensing device.

FIG. 26A is a schematic diagram of a top plan view of another embodiment of the pressure sensing device.

FIG. 26B is a schematic diagram of a cross-section view of the pressure sensing device of FIG. 26A along line 26B-26B.

FIG. 26C is a schematic diagram of a side elevation view of the pressure sensing device of FIG. 26A.

FIG. 27A is a schematic diagram of a top plan view of another embodiment of the pressure sensing device.

FIG. 27B is a schematic diagram of a cross-section view of the pressure sensing device of FIG. 27A along line 27B-27B.

FIG. 27C is a schematic diagram of a side elevation view of the pressure sensing device of FIG. 27A.

FIG. 28A is a schematic diagram of a top plan view of another embodiment of the pressure sensing device.

FIG. 28B is a schematic diagram of a cross-section view of the pressure sensing device of FIG. 28A along line 28B-28B.

FIG. 28C is a schematic diagram of a side elevation view of the pressure sensing device of FIG. 28A.

FIG. 29A is a schematic diagram of a top plan view of another embodiment of the pressure sensing device.

FIG. 29B is a schematic diagram of a cross-section view of the pressure sensing device of FIG. 29A along line 29B-29B.

FIG. 29C is a schematic diagram of a side elevation view of the pressure sensing device of FIG. 29A.

FIGS. 32A and 32B are schematic diagrams of a top plan view of another embodiment of the pressure sensing device.

FIG. 32C is a schematic diagram of a cross-section view of the pressure sensing devices of FIGS. 32A and 32B along line 32C-32C.

DETAILED DESCRIPTION OF ILLUSTRATIVE EMBODIMENTS

Figure 1:
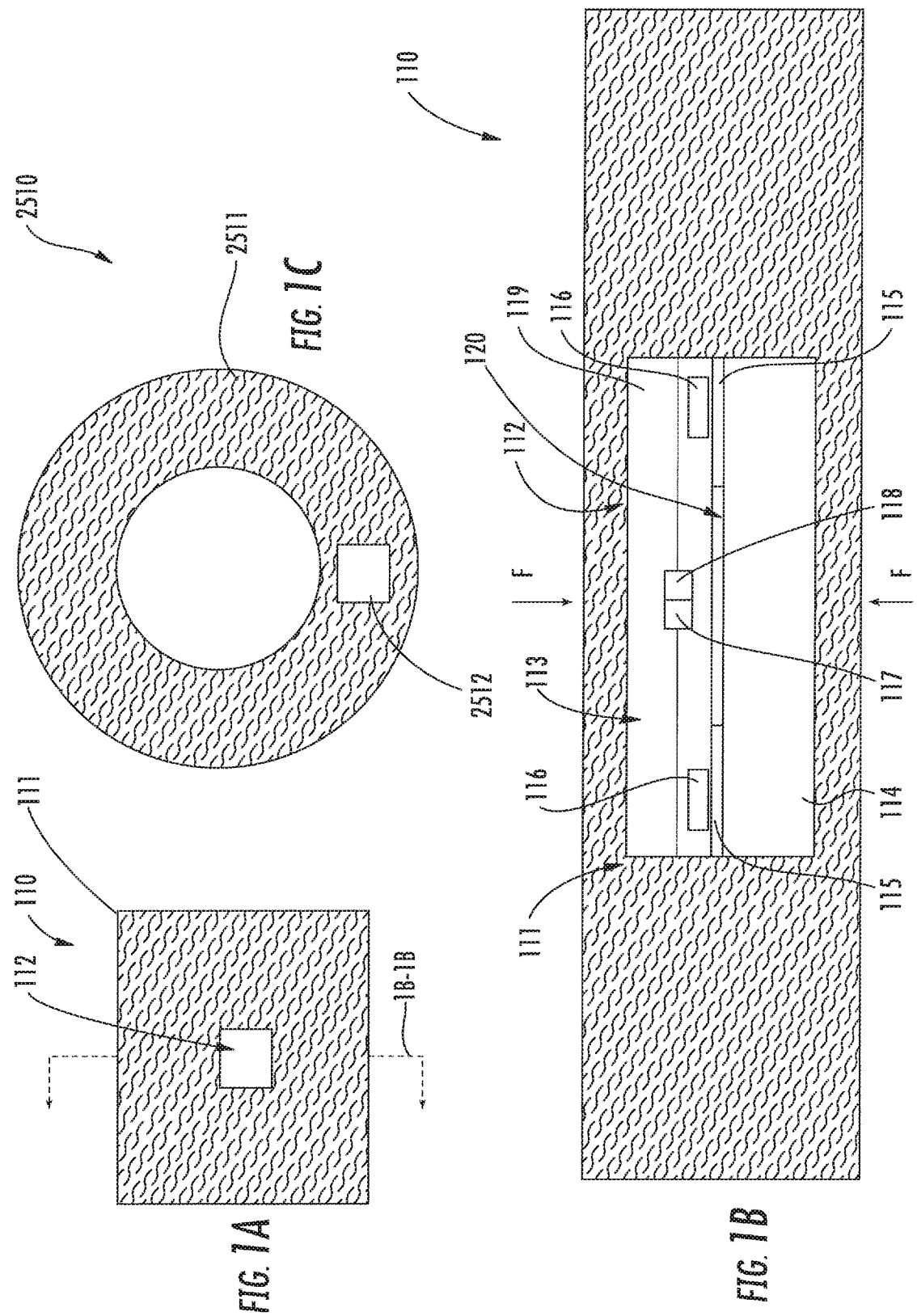
FIG. 1A is a schematic diagram of a top plan view of a pressure sensing device, according to the present disclosure.
FIG. 1B is a schematic diagram of a cross-section view of the pressure sensing device of FIG. 1A along line 1B-1B.
FIG. 1C is a schematic diagram of a top plan view of a pressure sensing device with a ring-shaped body, according to the present disclosure.
Figure 2:
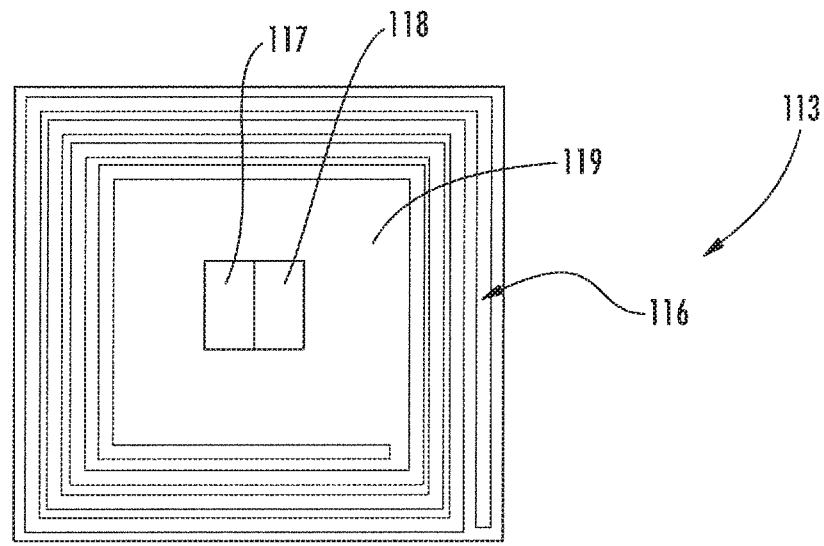
FIG. 2 is a schematic diagram of a top plan view of an IC die from the pressure sensing device of FIG. 1A.
Figure 3:
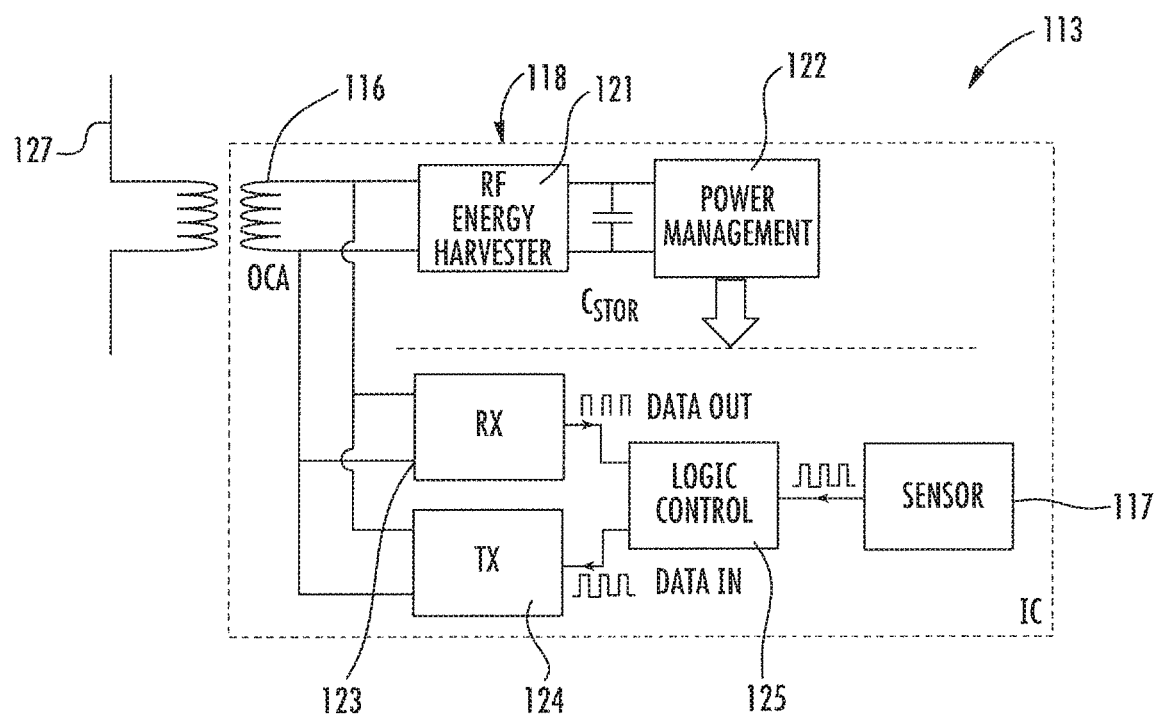
FIG. 3 is a schematic diagram of an embodiment of the IC die from the pressure sensing device of FIG. 1A.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout. Like numbers refer to like elements throughout, and base 100 reference numerals are used to indicate similar elements in alternative embodiments.

Referring to FIGS. 1A-3, a pressure sensing device 110 according to the present invention is now described. The pressure sensing device 110 illustratively includes a body in configured to distribute a load applied between first and second parts positioned one against the other (e.g. a threaded fastener, two aligned plates), and a pressure sensor 112 carried by the body. The pressure sensor 112 illustratively includes a support body 114, and an IC die 113 mounted with the support body and defining a cavity 120 therebetween.

In some embodiments, the body 111 may, for example, comprise a ring-shaped body 2511 (FIG. 1C) configured to distribute a load of a threaded fastener, achieving a washer pressure sensing device 2510 (FIG. 1C). The body 111 may have any kind of shape considering that the body 111 can be comprised between two parts that are at least partially overlapped applying a compressive stress on the body (as illustrated in the pressure sensing device 1010b in FIG. 13).

The IC die 113 illustratively includes a substrate 119 (e.g. silicon, gallium arsenide), pressure sensing circuitry 117 (e.g. piezoresistive or piezoelectric pressure/stress detection circuitry) carried by the substrate and responsive to bending associated with the cavity 120, and an IC interface 118 (e.g. external reader wired or wireless interface) carried by the substrate and coupled to the pressure sensing circuitry. Advantageously, the substrate 119 and the support body 114 may provide protection for the pressure sensing circuitry 117, thereby improving reliability.

In an example, the cavity 120 may have a thickness of about 1 micrometer (or more), the substrate 119 may have a thickness of about 100 micrometers, and the support body 114 may have a thickness of some hundreds of micrometers (i.e. 700 micrometers). This may advantageously enable the pressure sensing circuitry 117 to measure high pressure values, such as 100 atmospheres or more.

The pressure sensor 112 illustratively includes a bonding layer 115 (e.g. glass frit bonding layer) between the IC die 113 and the support body 114. For example, the support body 114 may comprise at least one of a ceramic material, a glass material, and a semiconductor material (e.g. silicon).

The IC interface 118, in an example, illustratively includes receiver and transmitter circuits 123, 124 (illustrated as separate circuits, but a combined circuit, commonly called a transceiver/transponder circuit, can be used), and electrically conductive antenna traces 116 carried by the substrate 119 and coupled to the transceiver circuit and configured to receive radio frequency (RF) energy. In the illustrated embodiment, the IC interface 118 also includes logic circuitry 125 coupled to the transceiver circuit 123, 124, an RF harvester circuit 121 coupled to the antenna traces 116, and a power management circuit 122 coupled to the RF harvester circuit. The power management circuit 122 is coupled to all other circuits 123, 124, 125 and 117 to supply power to them. An external antenna 127 is magnetically/electromagnetically coupled to antenna traces 116 to power the IC die 113. In other embodiments (not shown), the RF harvester circuit 121 and the power management circuit 122 may be replaced by an AC/DC converter, such as a rectifier circuit (and eventually a power control circuit like a limiter circuit) that may be typically used in RFID and Smart Card ICs.

Another aspect is directed to a method of making the pressure sensing device 110. The method may include forming a body 111 to distribute a load applied between two opposite surface of the body in, and coupling at least one pressure sensor 112 carried by the body. The at least one pressure sensor 112 may include a support body 114, and an IC die 113 mounted with the support body and defining a cavity 120 therebetween. The IC die 113 may include pressure sensing circuitry 117 responsive to bending associated with the cavity 120, and an IC interface 118 coupled to the pressure sensing circuitry.

Referring now additionally to FIGS. 4A-4D, another embodiment of the pressure sensing device 210 is now described. In this embodiment of the pressure sensing device 210, those elements already discussed above with respect to FIG. 1 are incremented by 100 and most require no further discussion herein. This embodiment differs from the previous embodiment in that this pressure sensing device 210 illustratively includes the pressure sensor 212 comprising an substrate 229 adjacent the IC die 213 and comprising a substrate 230, and additional electrically conductive antenna traces 231 magnetically/electromagnetically coupled to the electrically conductive antenna traces 216 (FIG. 4D). Advantageously, the substrate 219, the support body 214 and the bonding layer 215 may have high resistivity improving the coupling between electrically conductive antenna traces 231, 216. Additionally, the additional electrically conductive antenna traces 231 may surround the IC die 213. As shown, the method of making this embodiment of the pressure sensing device 210 includes using a carrier layer 228.

The IC die 213 is stacked on the support body 214 and joined by bonding layer 215. In more detail (FIG. 4A), the bonding layer 215 may be an uniform layer on the support body 214 and a portion of the layer can be removed using standard techniques like an etching or a laser beam to create the cavity 220 with the IC die 213. The IC die 213 and the support body 214 are positioned on the carrier layer 228 (FIG. 4B), and then encapsulated (FIG. 4C) using encapsulation material 232.

Once encapsulated, the carrier layer 228 may be released (FIG. 4D). Advantageously, the cavity 220 is created during assembly/packaging process and not during the semiconductor process steps by a recess/cavity in the substrate 219, simplifying production process and reducing manufacturing costs. Then, the cavity dimension can be easily modified, avoiding modification of IC die 213, and changing the full scale range and sensitivity of pressure sensor 212.

Referring now additionally to FIG. 5, another embodiment of the pressure sensing washer device 310 is now described. In this embodiment of the pressure sensing washer device 310, those elements already discussed above with respect to FIGS. 1 and 4A-4D are incremented by 200 and most require no further discussion herein. This embodiment differs from the previous embodiment in that this pressure sensing washer device 310 illustratively includes the substrate 329 extending beyond the IC die 313 and the ring-shaped body 311.

Advantageously, this embodiment may provide improved RF performance since the additional electrically conductive antenna traces 331 extend beyond the footprint of the threaded fastener, which typically comprises a metallic material. Also, in this embodiment, the additional electrically conductive antenna traces 331 define a Hertz dipole far field antenna, and the ring-shaped body 311 comprises encapsulation material.

Referring now additionally to FIG. 6, another embodiment of the pressure sensing washer device 410 is now described. In this embodiment of the pressure sensing washer device 410, those elements already discussed above with respect to FIG. 5 are incremented by 300 and most require no further discussion herein. This embodiment differs from the previous embodiment in that the encapsulation material also extends beyond the footprint of the threaded fastener and surrounds the substrate 429.

Referring now additionally to FIG. 7, another embodiment of the pressure sensing washer device 510 is now described. In this embodiment of the pressure sensing washer device 510, those elements already discussed above with respect to FIG. 5 are incremented by 400 and most require no further discussion herein. This embodiment differs from the previous embodiment in that the substrate 529 is circle-shaped. In this embodiment, the additional antenna traces 531 define a magnetic dipole and near field antenna with a fringing capacitor. The pressure sensing washer device 510 includes an arm extension extending outwardly from the ring-shaped body 511, and the additional electrically conductive antenna traces 531 are carried by the arm extension.

Referring now additionally to FIG. 8, another embodiment of the pressure sensing washer device 610 is now described. In this embodiment of the pressure sensing washer device 610, those elements already discussed above with respect to FIG. 7 are incremented by 500 and most require no further discussion herein. This embodiment differs from the previous embodiment in that the encapsulation material also extends beyond the footprint of the threaded fastener and surrounds the substrate 629.

Figure 9:
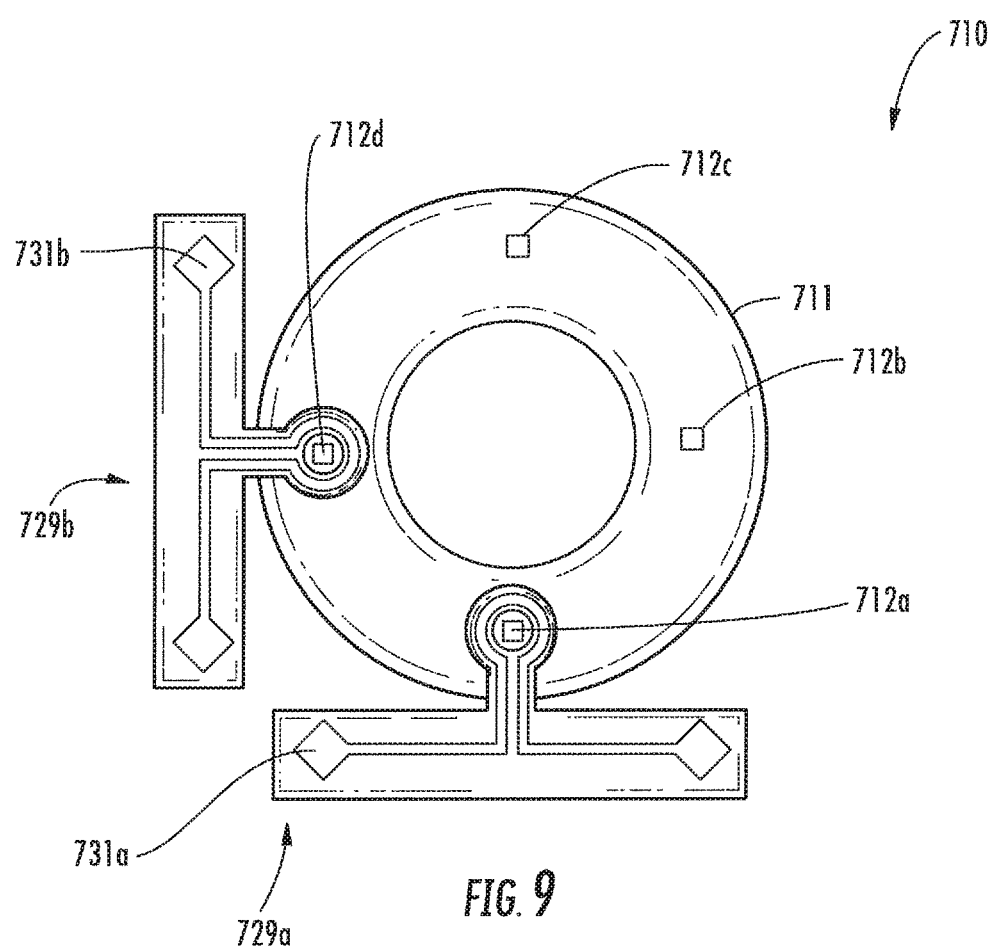

Referring now additionally to FIG. 9, another embodiment of the pressure sensing washer device 710 is now described. In this embodiment of the pressure sensing washer device 710, those elements already discussed above with respect to FIG. 5 are incremented by 600 and most require no further discussion herein. This embodiment differs from the previous embodiment in that the pressure sensing washer device 710 illustratively includes a plurality of pressure sensors 712a-712d spaced apart 90 degrees on the ring-shaped body 711, and a plurality of substrates 729a-729b extending beyond the IC die and the ring-shaped body 711. Advantageously, the plurality of pressure sensors 712a-712d may provide redundancy and improve reliability of the pressure sensing washer device 710. Also, the additional antenna traces 731a-731b may be polarized differently, thereby providing omnidirectional performance. In this embodiment, the ICs 712b, 712b without additional antenna traces may be dummy ICs, which ensure that mechanical stress throughout the ring-shaped body 711 is uniform. In other embodiments, the dummy ICs 712b, 712b can also be functional and include respective substrates and circuits.

Referring now additionally to FIGS. 10 and 11, another embodiment of the pressure sensing washer device 810 is now described. In this embodiment of the pressure sensing washer device 810, those elements already discussed above with respect to FIG. 1 are incremented by 700 and most require no further discussion herein. Here, the pressure sensing washer device 810 is installed with a fastener 833

(e.g. illustrated bolt) fixing together first and second plates 834a-834b. The pressure sensing washer device 810 is positioned between the head of the bolt 833 and an adjacent plate 834a. In FIG. 10, first and second washer layers 835a-835b (e.g. Teflon) are used to ensure uniform surface-stress and prevent damage to the pressure sensing washer device 810 due to irregular surface features of the bolt 833. Second washer layer 835a and/or 835b may improve also the coupling between electrically conductive antenna traces 231, 216 in FIG. 4D increasing their distance with fastener 833 and/or first plates 834a in case it is conductive.

Figure 12:
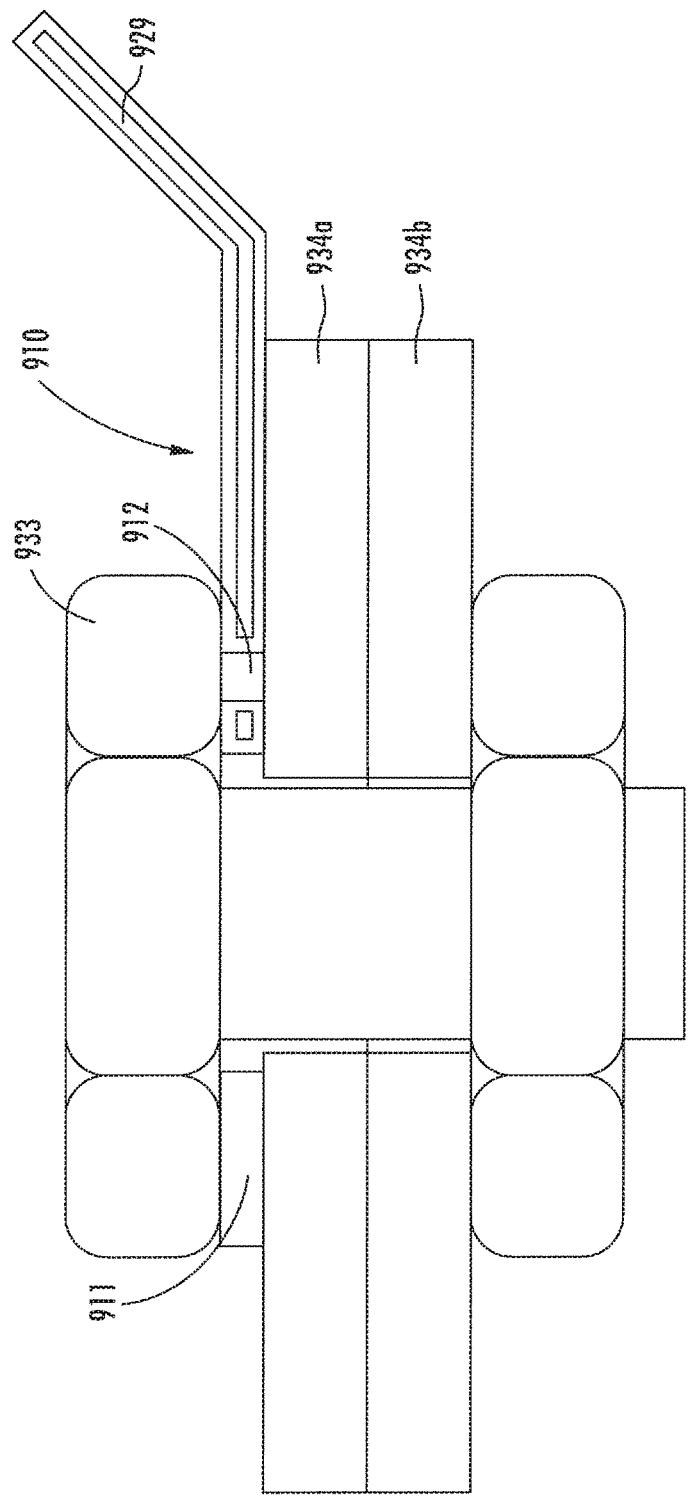

Referring now additionally to FIG. 12, another embodiment of the pressure sensing washer device 910 is now described. In this embodiment of the pressure sensing washer device 910, those elements already discussed above with respect to FIGS. 10 and 11 are incremented by 800 and most require no further discussion herein. Here, the pressure sensing washer device 910 illustratively includes the substrate 929 canted with respect to the pressure sensor 912 and the IC die therein, thereby improving RF performance.

Referring now additionally to FIGS. 13 and 14, another embodiment of the pressure sensing device 1010 is now described. In this embodiment of the pressure sensing device 1010, those elements already discussed above with respect to FIG. 1 are incremented by 900 and most require no further discussion herein. Here, first and second pressure sensing device 1010a-1010b are installed and communicated with via an external system 1035 and associated external antenna 1036. Helpfully, the external system 1035 may communicate with many devices simultaneously, for example, when inspecting a large structure. In FIG. 14, an external RF concentrator 1037, 1038 may be used to enhance RF performance between the external system 1035 and the pressure sensing device 1010.

Referring now additionally to FIGS. 15A and 15B, another embodiment of the pressure sensing washer device 1110 is now described. In this embodiment of the pressure sensing washer device 1110, those elements already discussed above with respect to FIG. 1 are incremented by 1000 and most require no further discussion herein. This embodiment differs from the previous embodiment in that this pressure sensing washer device 1110 illustratively includes the ring-shaped body 1111 having a slot therein, and the pressure sensor 1112 is positioned in the slot. The pressure sensing washer device 1110 illustratively includes encapsulation material 1132 in the slot and surrounding the pressure sensor 1112. Here, the ring-shaped body 1111 may comprise a metallic material, such as steel, nickel, or tungsten or a combination thereof.

Figure 16:
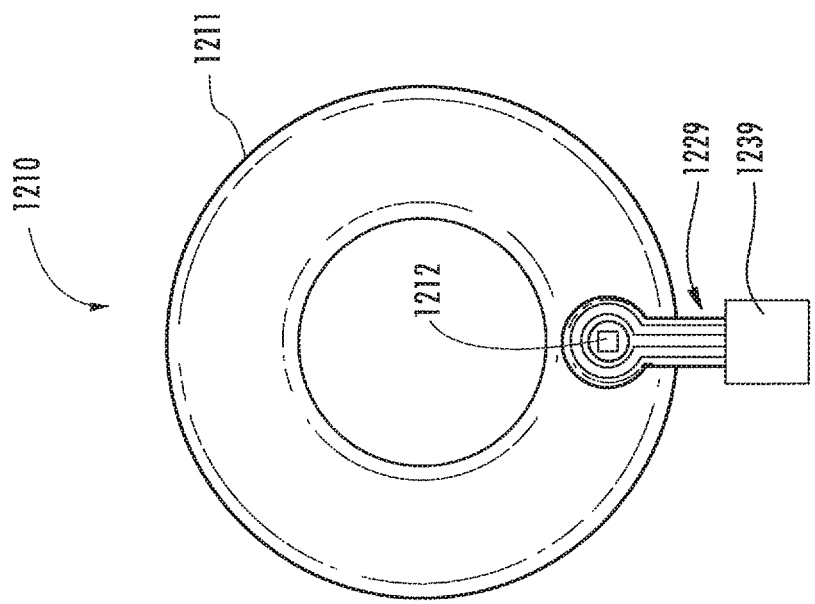
Figure 18:
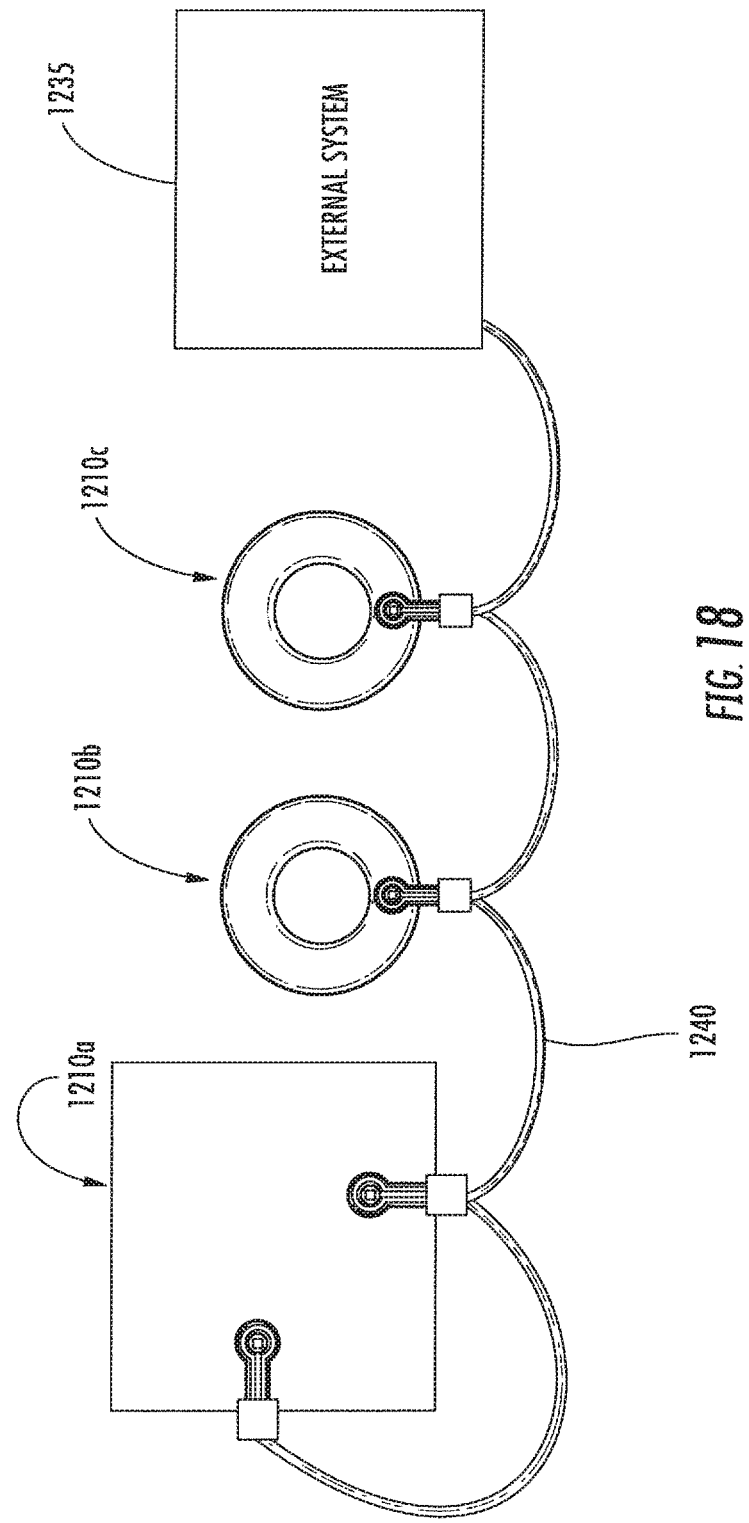

Referring now additionally to FIGS. 16 and 18, another embodiment of the pressure sensing device 1210 is now described. In this embodiment of the pressure sensing device 1210, those elements already discussed above with respect to FIG. 1 are incremented by 1100 and most require no further discussion herein. This embodiment differs from the previous embodiment in that this pressure sensing device 1210 illustratively includes an RF connector 1239 coupled to the substrate 1229, which replaces the RF concentrator of FIG. 14.

In FIG. 18, a wired embodiment is shown. Here, three pressure sensing devices 12143a-1210c are coupled to the external system 1235 via a wire 1240 (e.g. coaxial cable) coupled to each RF connector 1239.

Figure 17:
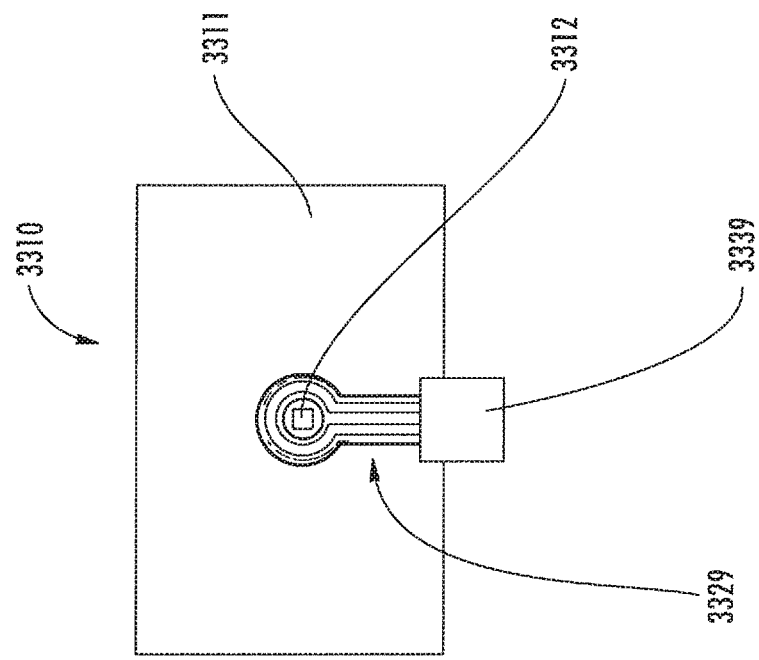
FIGS. 16-18 are schematic diagrams of a top plan view of other embodiments of the pressure sensing device.

Referring now additionally to FIG. 17, another embodiment of the pressure sensing device 3310 is now described. In this embodiment of the pressure sensing device 3310, those elements already discussed above with respect to FIG. 16 are incremented by 3200 and most require no further discussion herein. This embodiment differs from the previous embodiment in that this pressure sensing device 3310 illustratively includes encapsulation material surrounding the RF connector 3339, and the body 3311 is rectangle-shaped.

Figure 22:
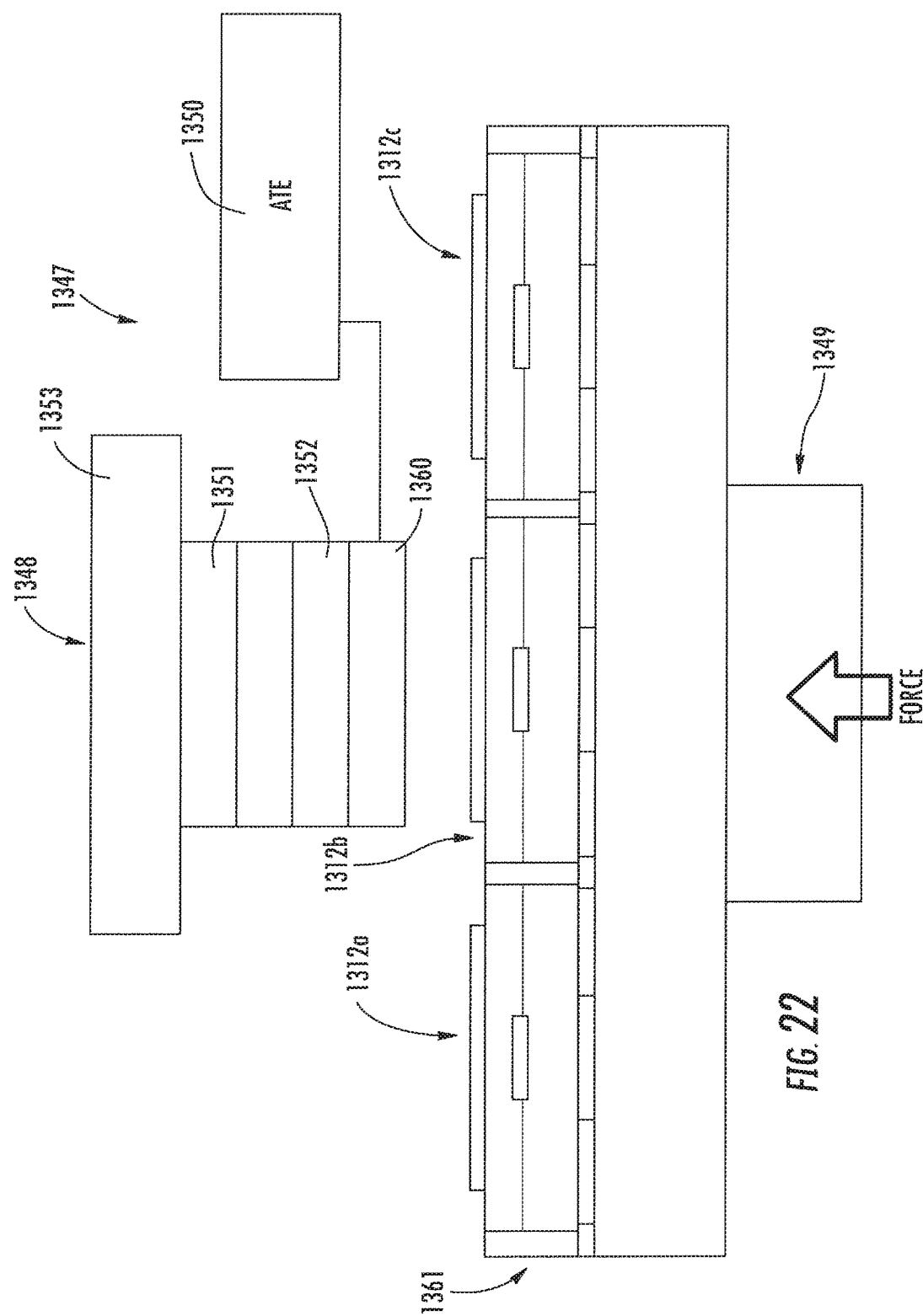
FIGS. 22-23 are schematic diagrams of a side elevation plan view of the pressure sensing device of FIG. 19 during testing.

Referring now additionally to FIGS. 19 and 22, another embodiment of the pressure sensing device 1310 is now described. In this embodiment of the pressure sensing device 1310, those elements already discussed above with respect to FIG. 1 are incremented by 1200 and most require no further discussion herein. This embodiment differs from the previous embodiment in that this pressure sensing device 1310 illustratively includes a body 1711 configured to distribute a load of an external compressive stress, and a pressure sensor 1312 carried by the body. The pressure sensor 1312 illustratively includes an IC die 1313 mounted with the body and defining a cavity 1320 with adjacent portions of the body. The IC die 1313 illustratively includes pressure sensing circuitry 1317 responsive to bending associated with the cavity, and an IC interface 1318 coupled to the pressure sensing circuitry. More specifically, the pressure sensor 1312 illustratively includes a first spacer layer 1315 adjacent the IC die 1313 and also defining the cavity, and a second spacer layer 1341 adjacent the IC die. The first and second spacer layers 1315, 1341 may comprise a metallic material, such as nickel, chrome, gold, aluminum, copper, gold-tin.

Yet another aspect is directed to a method of making the pressure sensing device 1310. The method may include forming a body configured to distribute a load of an external compressive stress, and coupling at least one pressure sensor 1312 carried by the body. The at least one sensor 1312 may include an IC die 1313 mounted with the support body and defining a cavity 1320 with adjacent portions of the body. The IC die 1313 may include pressure sensing circuitry 1317 responsive to bending associated with the cavity, and an IC interface 1318 coupled to the pressure sensing circuitry.

In FIG. 22, a wafer 1361 comprising a plurality of pressure sensing devices 1312a-1312c is tested with testing system 1347. The testing system 1347 illustratively includes an arm 1348 comprising a rigid substrate 1353, a load cell 1351 coupled to the rigid substrate, a ball joint 1352 coupled to the load cell, and a contact plate 1360 for applying set pressure to each pressure sensing device 1312a-1312c. The testing system 1347 illustratively includes a prober chuck 1349, and an Automatic Testing Equipment (ATE) 1350 coupled to the arm 1348 and the prober chuck. The arm 1348 presses each pressure sensing device 1312a-1312c and also provides power (via the contact plate 1360) and signals to the device.

Referring now additionally to FIG. 20, another embodiment of the pressure sensing device 1410 is now described. In this embodiment of the pressure sensing device 1410, those elements already discussed above with respect to FIG. 19 are incremented by 1300 and most require no further discussion herein. This embodiment differs from the previous embodiment in that this pressure sensing device 1410 illustratively includes the second spacer layer 1441 extending across the entirety of the substrate 1419.

In FIGS. 4A-4D the cavity 220 is created starting from the support body 114 instead of in FIGS. 19-20 the cavity 1320, 1420 is created starting from the IC die 1313 (on the bottom surface), 1314 (on the top surface).

Figure 21:
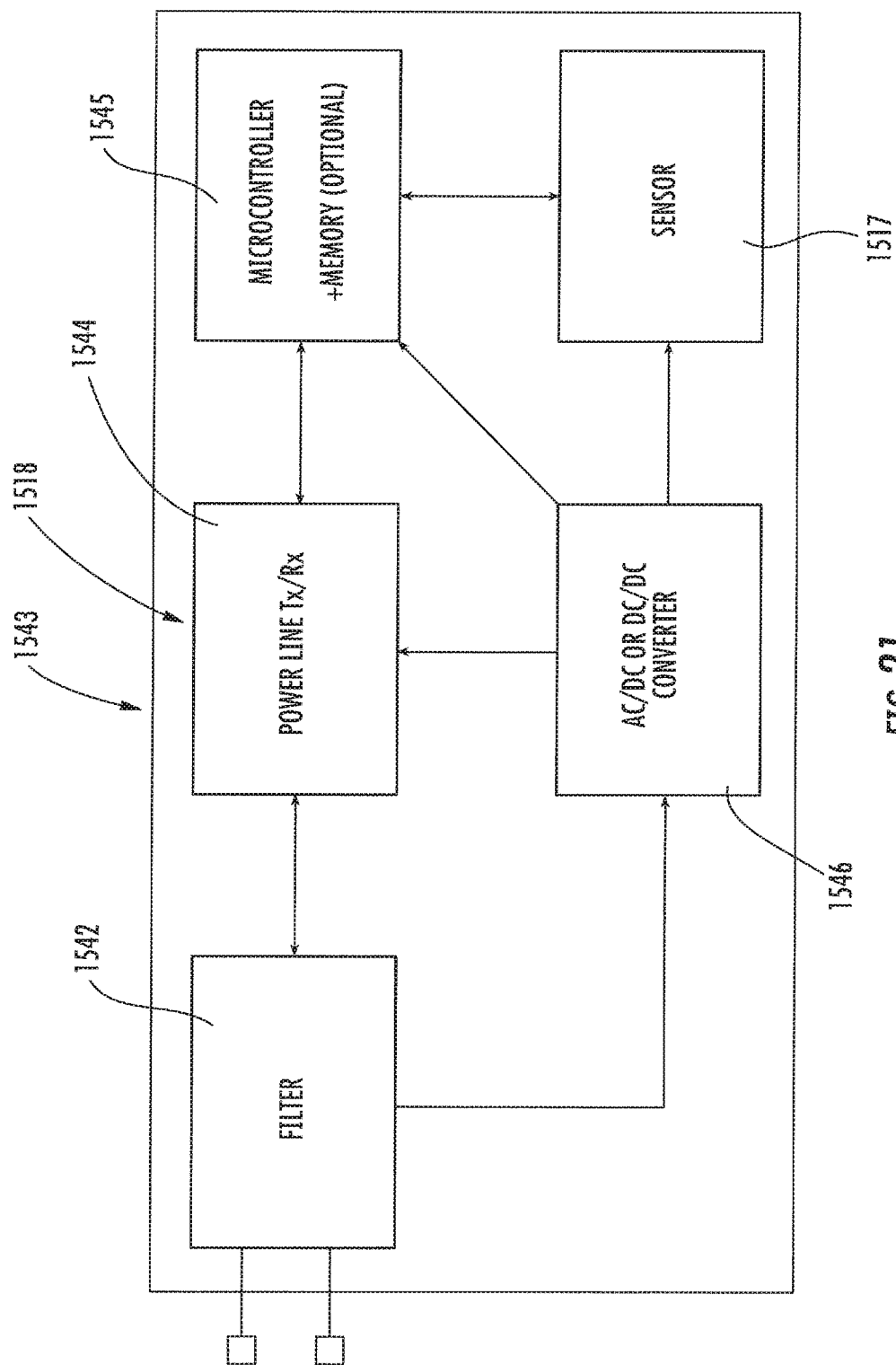
FIG. 21 is a schematic diagram of an embodiment of the IC die from the pressure sensing device.

Referring now additionally to FIG. 21, another embodiment of the pressure sensing device is now described. In this embodiment of the pressure sensing device, IC die 1513 illustratively includes a filter circuit 1542, a power line transceiver/transponder circuit 1544 coupled to the filter circuit, a controller circuit 1545 (that optionally may include memory) coupled to the transceiver circuit, a sensor 1517 coupled to the controller, and an AC/DC or a DC/DC converter 1546 (can be omitted in other embodiments) coupled to the filter, transceiver, and controller circuits.

Figure 23:
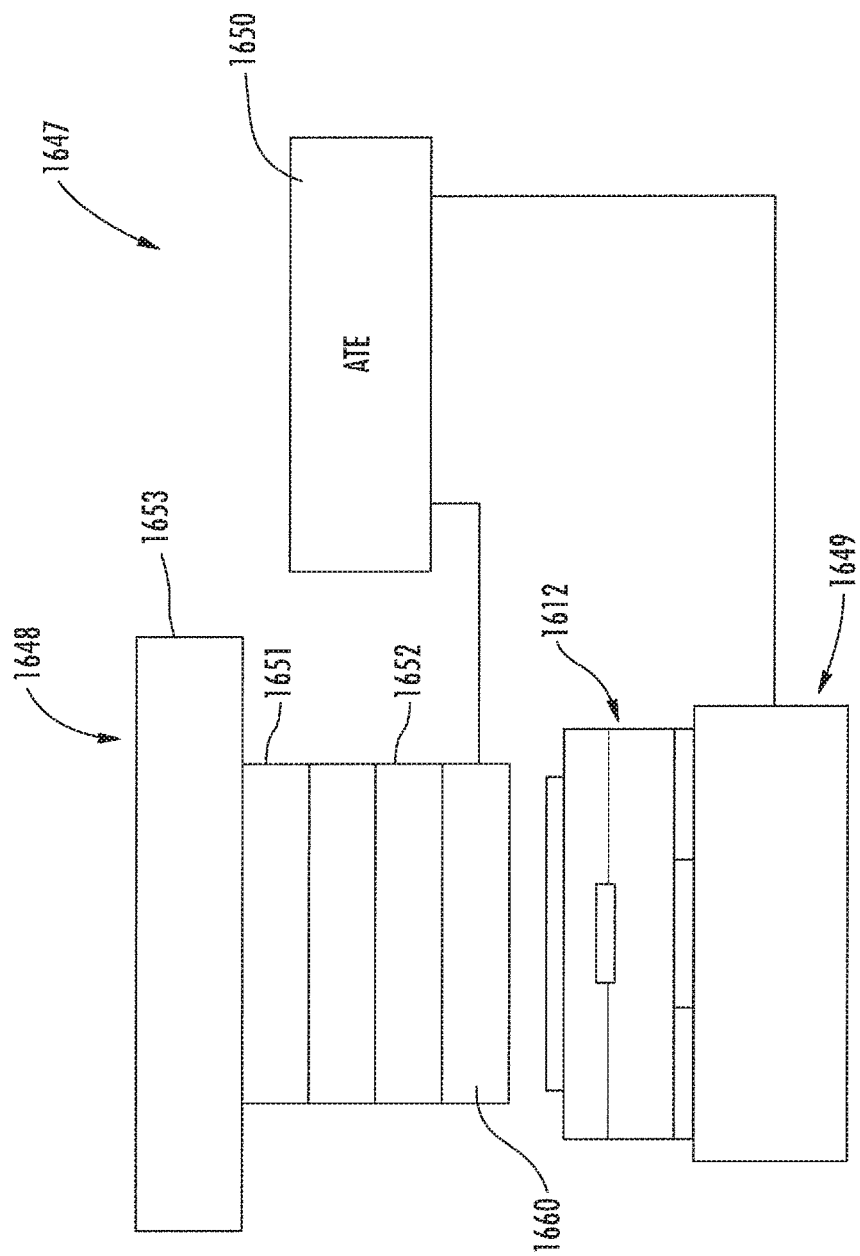

Referring now additionally to FIG. 23, another embodiment of the testing system 1647 is now described. In this embodiment of the testing system 1647, those elements already discussed above with respect to FIGS. 19 and 22 are incremented by 1500 and most require no further discussion herein. This embodiment differs from the previous embodiment in that this testing system 1647 tests a single pressure sensor 1612 at a time.

Figure 24A:
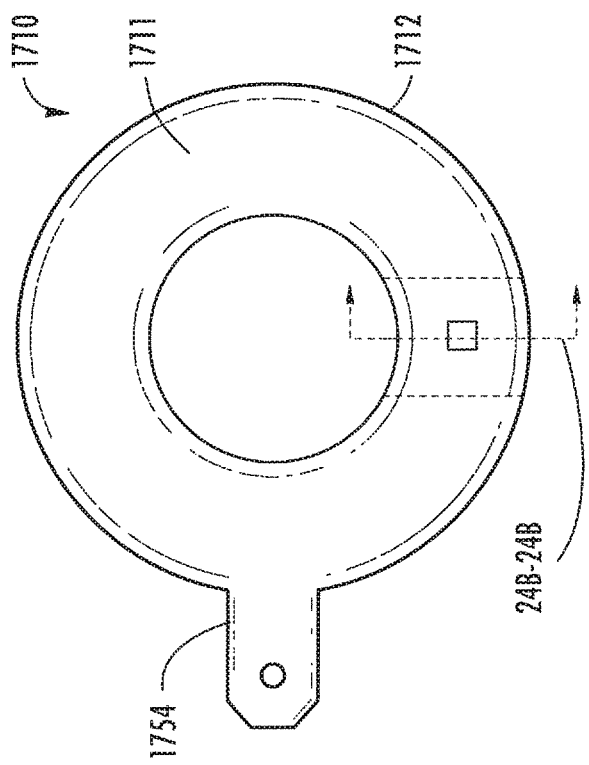
FIG. 24A is a schematic diagram of a top plan view of another embodiment of the pressure sensing device.
Figure 24B:
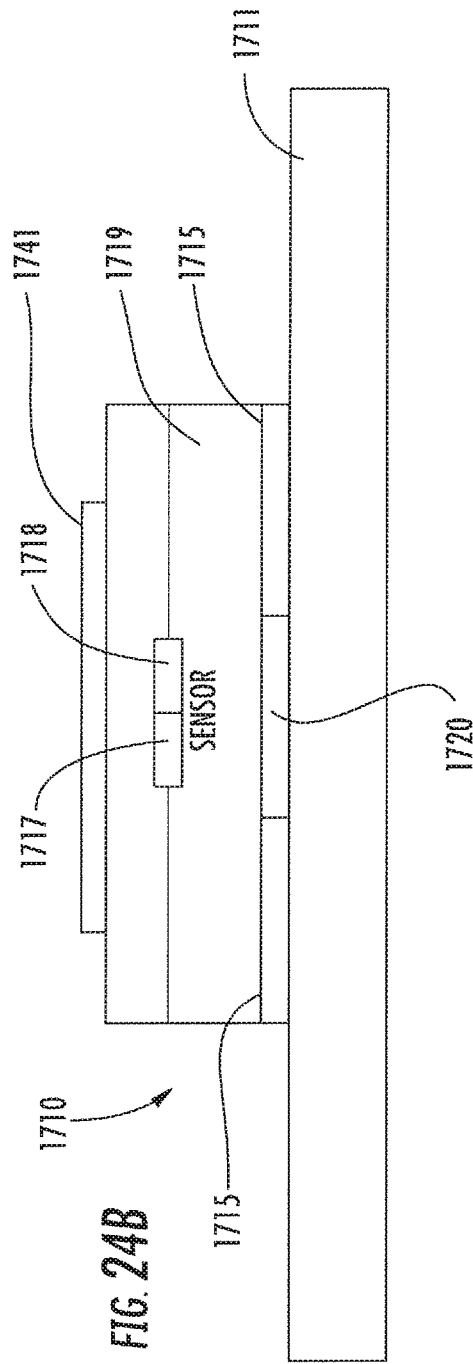
FIG. 24B is a schematic diagram of a cross-section view of the pressure sensing device of FIG. 24A along line 24B-24B.
Figure 25:
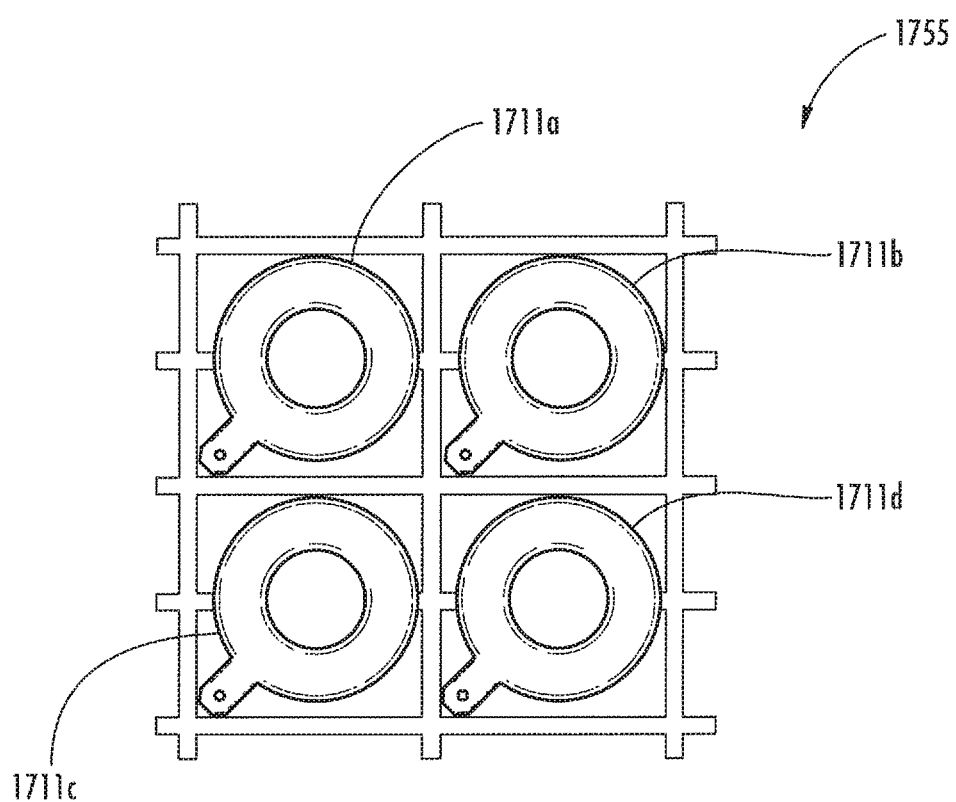
FIG. 25 is a top plan view of the pressure sensing device of FIG. 24A during manufacture.

Referring now additionally to FIGS. 24A, 24B, and 25, another embodiment of the pressure sensing washer device 1710 is now described. In this embodiment of the pressure sensing washer device 1710, those elements already discussed above with respect to FIG. 19 are incremented by 1600 and most require no further discussion herein. This embodiment differs from the previous embodiment in that this pressure sensing washer device 1710 is mounted onto the ring-shaped body 1711, which includes a connector 1754 extending outwardly therefrom. Here, the ring-shaped body 1711 comprises a metallic material, and the first spacer layer 1715 is soldered/welded onto the ring-shaped body to define the cavity 1720. As shown in FIG. 25, the ring-shaped body 1711 can be readily manufactured in large numbers by forming a lead frame 1755.

Referring now additionally to FIGS. 26A, 26B, and 26C, another embodiment of the pressure sensing washer device 1810 is now described. In this embodiment of the pressure sensing washer device 1810, those elements already discussed above with respect to FIG. 19 are incremented 1700 and most require no further discussion herein. This embodiment differs from the previous embodiment in that this pressure sensing washer device 1810 illustratively includes encapsulating material 1832 surrounding the pressure sensor 1812 and covering the ring-shaped body 1811.

Referring now additionally to FIGS. 27A, 27B, and 27C, another embodiment of the pressure sensing washer device 1910 is now described. In this embodiment of the pressure sensing washer device 1910, those elements already discussed above with respect to FIG. 19 are incremented by 1800 and most require no further discussion herein. This embodiment differs from the previous embodiment in that this pressure sensing washer device 1910 illustratively includes first and second ring-shaped bodies 1911a-1911b aligned together, and encapsulating material 1932 between the ring-shaped bodies and surrounding the pressure sensor 1912.

Figure 31:
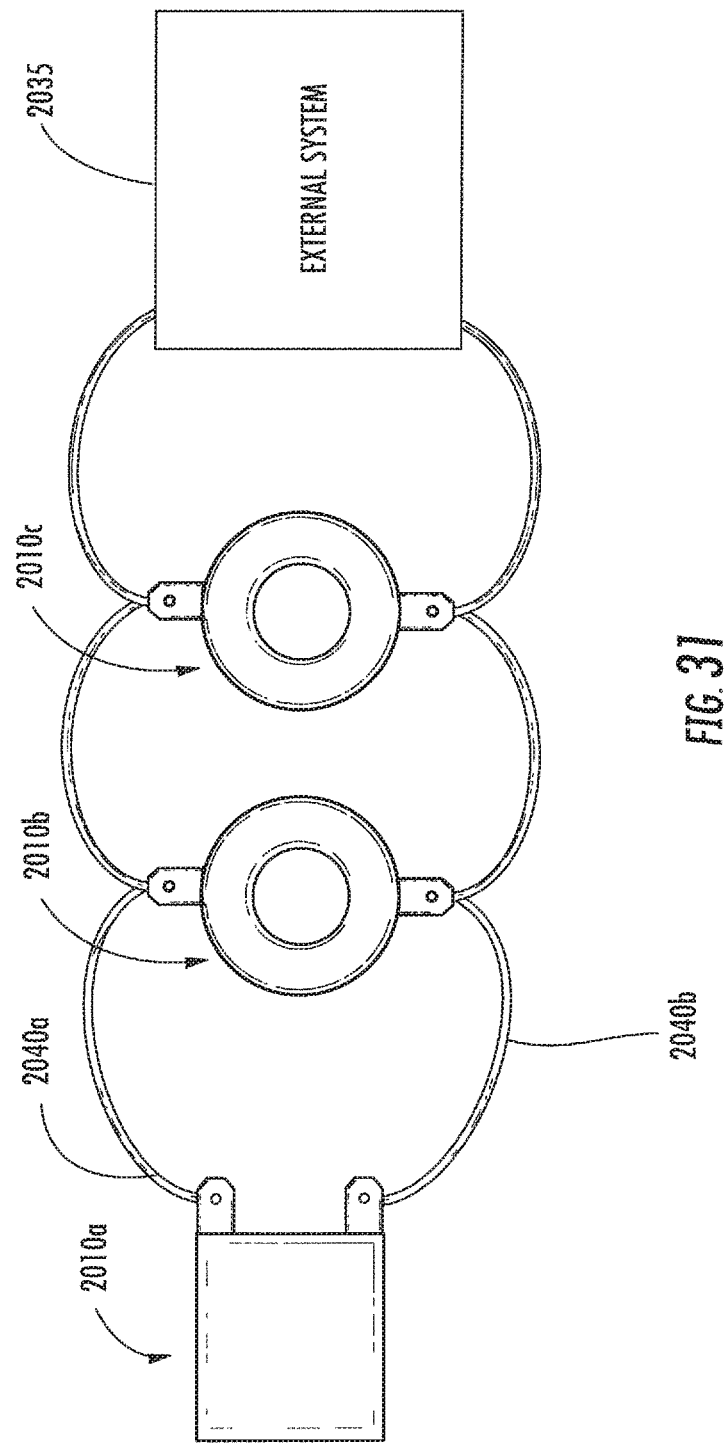
FIG. 31 is a schematic diagram of a top plan view of another embodiment of the pressure sensing device.

Referring now additionally to FIGS. 28A, 28B, 28C, and 31, another embodiment of the pressure sensing washer device 2010 is now described. In this embodiment of the pressure sensing washer device 2010, those elements already discussed above with respect to FIGS. 19 and 27A-27C are incremented by 1900 and most require no further discussion herein. This embodiment differs from the previous embodiment in that this pressure sensing washer device 2010 illustratively includes first and second insulator layers 2056a-2056b covering external surfaces of the first and second ring-shaped bodies 2011b-2011c. In FIG. 31, a wired embodiment is shown. Here, three pressure sensing devices 2010a-2010c are coupled to the external system 2035 via wires 24340a-2040b (e.g. twisted pair cable).

Referring now additionally to FIGS. 29A, 29B, and 29C, another embodiment of the pressure sensing washer device 2110 is now described. In this embodiment of the pressure sensing washer device 2110, those elements already discussed above with respect to FIGS. 19 and 28A-28C are incremented by 2000 and most require no further discussion herein. This embodiment differs from the previous embodiment in that this pressure sensing washer device 2110 illustratively includes a mechanical guide 2157 extending between the first and second ring-shaped bodies 2111a-2111b, and the second insulator layer 2156b includes a portion 2158 that to meet the mechanical guide.

Figure 30A:
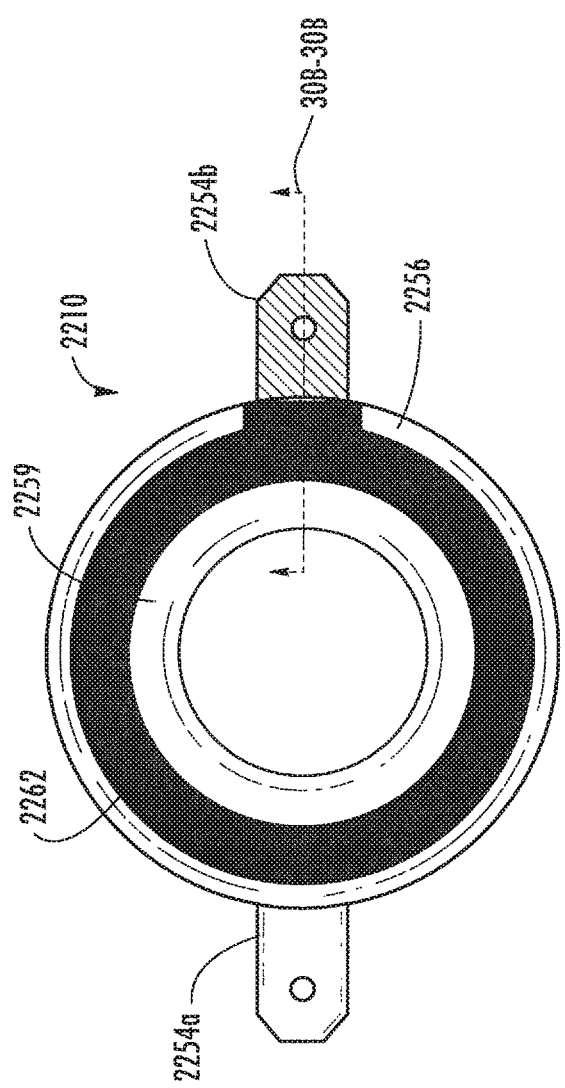
FIG. 30A is a schematic diagram of a top plan view of another embodiment of the pressure sensing device.
Figure 30B:
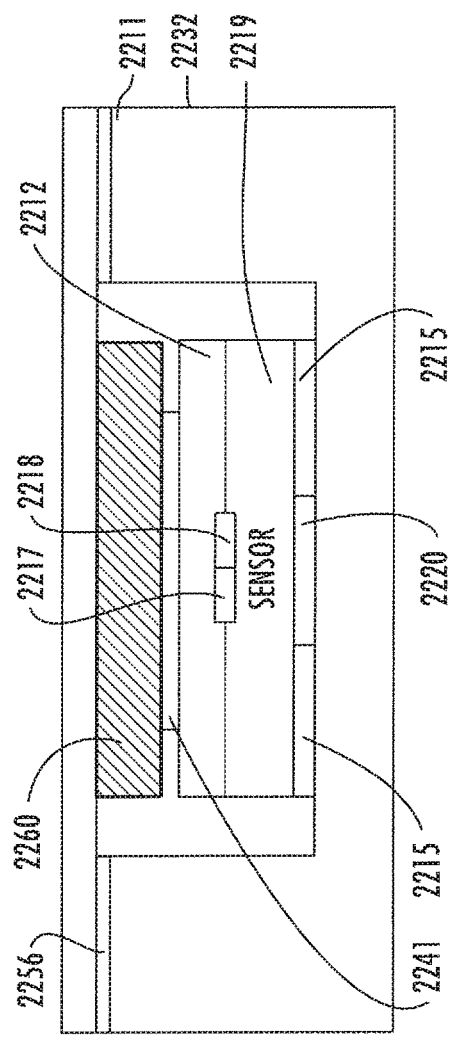
FIG. 30B is a schematic diagram of a cross-section view of the pressure sensing device of FIG. 30A along line 30B-30B.

Referring now additionally to FIGS. 30A and 30B, another embodiment of the pressure sensing washer device 2210 is now described. In this embodiment of the pressure sensing washer device 2210, those elements already discussed above with respect to FIGS. 19 and 28A-28C are incremented by 2100 and most require no further discussion herein. This embodiment differs from the previous embodiment in that this pressure sensing washer device 2210 illustratively includes the ring-shaped body 2211 defining a ring-shaped recess therein, and the pressure sensor 2212 is positioned within the ring-shaped recess. The pressure sensing washer device 2210 illustratively includes a ring-shaped layer 2262 over the pressure sensor 2212 and aligned with the ring-shaped recess.

Referring now additionally to FIGS. 32A, 32B, and 32C, another embodiment of the pressure sensing device 2310 is now described. In this embodiment of the pressure sensing device 2310, those elements already discussed above with respect to FIGS. 19 and 28A-28C are incremented by 2200 and most require no further discussion herein. This embodiment differs from the previous embodiment in that this pressure sensing device 2310 illustratively includes an IC die 2313 that is coupled by wire bonding 2380 to the substrate 2329, that surround the IC die 2313 and is coupled with a connector 2339.

In FIG. 32A the pressure sensing device 2310 may have some openings 2482a-2482d, for example, in the periphery, to join it with at least one of the two parts that apply the compressive stress. A body 2411, for example, with T-shaped cross-section in FIG. 32B, is mechanically coupled with the IC die 2313 to apply the compressive stress.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

What is claimed is:

1. A pressure sensing system, comprising:
   a first main body that is disposed between a first member and a second member that is positioned against the first member in a structure, and that experiences a load applied between the first member and the second member; and
   a first pressure sensor carried in an interior of the first main body;
   wherein the first pressure sensor comprises:
   a support body;
   a semiconductor die;
   a bonding layer physically attaching the semiconductor die to the support body, the bonding layer being made of a material different from the support body, the semiconductor die comprising an unsupported middle and two supported sides on either side of the unsupported middle, wherein the two supported sides are mounted on the bonding layer; and a cavity inside the first pressure sensor, wherein the cavity is enclosed by a sidewalls made of the bonding layer, a bottom surface made of the support body and a top surface made of the unsupported middle of the semiconductor die;

wherein the semiconductor die comprises a pressure sensing circuitry, and an IC interface coupled to the pressure sensing circuitry;

wherein the pressure sensing circuitry is disposed in the unsupported middle, and over a portion of the cavity;

wherein the pressure sensing circuitry is adapted to be responsive to a bending of the semiconductor die through the unsupported middle;

wherein the IC interface comprises a transceiver circuit, and an internal antenna trace coupled to the transceiver circuit; and wherein the internal antenna trace is disposed over an area where a supported side of the semiconductor die is mounted on the support body.

2. The pressure sensing system according to claim 1, wherein the first main body comprises an opening through the first main body at a position external to the first pressure sensor, wherein the opening is used to accept an attachment that secures the first main body to the first member or to the second member.

3. The pressure sensing system according to claim 1, further comprising:
a substrate with a first portion surrounding the first pressure sensor, and a second portion that is an arm extending away from the first portion and extending outside of the first main body;
wire bonding connecting the first pressure sensor to the first portion of the substrate; and
a radio frequency (RF) connector that is coupled with the substrate, and that is disposed outside of the first main body, wherein the RF connector is adapted to transmit output of the first pressure sensor to an external system.

4. The pressure sensing system according to claim 1, further comprising a radio frequency (RF) concentrator that is external to the first pressure sensor, and that is adapted to receive an output of the first pressure sensor and transmit the output to an external system that monitors the pressure sensing system.

5. The pressure sensing system according to claim 1, further comprising a first external antenna trace that is external to the first pressure sensor, wherein the first external antenna trace is coupled to the internal antenna trace.

6. The pressure sensing system according to claim 5, wherein the internal antenna trace and the first external antenna trace are electrically conductive, so that the first external antenna trace is adapted to supply power to the semiconductor die through the internal antenna trace.

7. The pressure sensing system according to claim 5, wherein the first pressure sensor further comprises a substrate that is adjacent to the semiconductor die and that surrounds the semiconductor die, wherein the first external antenna trace surrounds the semiconductor die, and wherein the first external antenna trace is carried in the substrate, and is coupled to the transceiver circuit.

8. The pressure sensing system according to claim 7, further comprising a first RF concentrator that is external to the first main body and external to the first pressure sensor, wherein the first RF concentrator is adapted to receive an output from the first external antenna trace in the first pressure sensor and transmit the output to a monitoring system that is remote from the pressure sensing system, the first member, and the second member.

9. The pressure sensing system according to claim 8, wherein the first RF concentrator comprises an antenna adapted to wirelessly transmit the output to the monitoring system, wherein the monitoring system is adapted to receive a plurality of outputs from a plurality of pressure sensors installed in the structure, wherein the plurality of pressure sensors includes the first pressure sensor and a second pressure sensor.

10. The pressure sensing system according to claim 5, further comprising:
a first substrate carrying the first external antenna trace, wherein the first substrate extends away from the first pressure sensor;
a first RF connector that is coupled to the first substrate, and that is disposed externally to the first pressure sensor;
an external system adapted to receive outputs of the pressure sensing system; and
a wire connecting the first RF connector to the external system;
wherein the first RF connector is adapted to transmit, via the wire, an output of the first pressure sensor to the external system.

11. The pressure sensing system according to claim 10, further comprising:
a second pressure sensor carried in the interior of the first main body, wherein the second pressure sensor is disposed remote from the first pressure sensor;
a second external antenna trace that is coupled to the second pressure sensor;
a second substrate carrying the second external antenna trace, wherein the second substrate extends from the second pressure sensor; and
a second RF connector coupled to the second substrate;
wherein the wire connects the second RF connector to the first RF connector.

12. The pressure sensing system according to claim 10, further comprising:
a second main body configured to distribute a load between a third member and a fourth member positioned against the third member in the structure, wherein the second main body has an interior and an exterior, wherein the second main body is disposed between the third member and the fourth member, and wherein the first member and the third member are different or same members, and the second member and the fourth member are different or same members; and
a second pressure sensor carried in the interior of the second main body;
a second external antenna trace that is coupled to the second pressure sensor;
a second substrate carrying the second external antenna trace, wherein the second substrate extends away from the second pressure sensor; and
a second RF connector coupled to the second substrate;
wherein the wire connects the second RF connector to the first RF connector.

13. The pressure sensing system according to claim 12, wherein the first main body comprises a first washer, and the second main body comprises a second washer that is different from the first washer.

14. A pressure sensing system, comprising:
a first pressure monitor disposed between a first member and a second member that is positioned against the first member, and that experiences a first load applied between the first member and the second member;

a first pressure sensor carried in an interior of the first pressure monitor; and an external system adapted to monitor for output from the first pressure monitor;

wherein the first pressure sensor comprises
  a support body,
  a semiconductor die;
  a bonding layer physically attaching the semiconductor die to the support body, the bonding layer being made of a material different from the support body, the semiconductor die comprising an unsupported middle and two supported sides on either side of the unsupported middle, wherein the two supported sides are mounted on the bonding layer, and
  a cavity inside the first pressure sensor, wherein the cavity is enclosed by sidewalls made of the bonding layer, a bottom surface made of the support body and a top surface made of the unsupported middle of the semiconductor die;

wherein the semiconductor die comprises a pressure sensing circuitry, and an IC interface coupled to the pressure sensing circuitry;

wherein the pressure sensing circuitry is disposed in the unsupported middle, and over a portion of the cavity;

wherein the pressure sensing circuitry is adapted to be responsive to a bending of the semiconductor die through the unsupported middle;

wherein the IC interface comprises a transceiver circuit, and an internal antenna trace coupled to the transceiver circuit; and wherein the internal antenna trace is disposed over an area where a supported side of the semiconductor die is mounted on the support body.

15. The pressure sensing system of claim 14, further comprising:
  a second pressure monitor disposed between a third member and a fourth member that is positioned against the third member, and that experiences a second load applied between the third member and the fourth member;
  a first wire connecting the first pressure monitor to the second pressure monitor; and
  a second wire connecting the second pressure monitor to the external system;
  wherein the external system is further adapted to monitor for output from the second pressure monitor; and
  wherein the first pressure monitor and the second pressure monitor are comprised of smart washers, and each smart washer comprises a washer and a pressure sensor disposed in the washer.

16. The pressure sensing system according to claim 15, wherein each pressure sensor further comprises an external antenna trace that is external to the pressure sensor, wherein the external antenna trace is coupled to the internal antenna trace.

17. The pressure sensing system according to claim 16, wherein the internal antenna trace and the external antenna trace are electrically conductive, so that the external antenna trace is adapted to supply power to the semiconductor die through the internal antenna trace.

18. The pressure sensing system according to claim 16, wherein each pressure sensor further comprises a substrate that is adjacent to the semiconductor die and that surrounds the semiconductor die, wherein the external antenna trace surrounds the semiconductor die, and wherein the external antenna trace is carried in the substrate, and is coupled to the transceiver circuit.

19. The pressure sensing system according to claim 18, wherein each smart washer further comprises a radio frequency (RF) concentrator that is external to the washer and the pressure sensor; and
  wherein, with respect to the first pressure monitor, the RF concentrator is adapted to receive an output from the external antenna trace in the pressure sensor and use the first wire to transmit the output of the pressure sensor; and
  wherein, with respect to the second pressure monitor, the RF concentrator is adapted to receive an output from the external antenna trace in the pressure sensor and use the second wire to transmit the output of the pressure sensor.

20. The pressure sensing system of claim 14, further comprising:
  a second pressure monitor disposed between a third member and a fourth member that is positioned against the third member, and that experiences a second load applied between the third member and the fourth member;
  wherein the external system is further adapted to wirelessly monitor for output from the first pressure monitor and the second pressure monitor.

21. The pressure sensing system of claim 14, further comprising:
  a first substrate extending away from the first pressure sensor;
  a first external antenna trace disposed in the first substrate and coupled to the first pressure sensor;
  a first RF connector coupled to the first substrate, and disposed externally to the first pressure sensor;
  a second pressure sensor;
  a second substrate extending away from the second pressure sensor;
  a second external antenna trace disposed in the second substrate and coupled to the second pressure sensor;
  a second RF connector coupled to the second substrate, and disposed externally to the second pressure sensor; and
  a wire connects the second RF connector to the first RF connector.

22. A pressure sensing system, comprising:
  a first main body that is disposed between a first member and a second member that is positioned against the first member in a structure, the first main body being configured to experience a load applied between the first member and the second member; and
  a first pressure sensor disposed within the first main body, wherein the first pressure sensor comprises an internal antenna trace disposed over a peripheral region of the first pressure sensor, an unsupported central region surrounded by the peripheral region, the unsupported central region comprising a pressure sensing circuitry disposed over a cavity, wherein the pressure sensing circuitry is configured to be responsive to a bending of the unsupported central region;
  a first substrate extending away from the first pressure sensor;
  a first external antenna trace disposed in the first substrate and coupled to the first pressure sensor;
  a first RF connector coupled to the first substrate, and disposed externally to the first pressure sensor;

a second pressure sensor;
a second substrate extending away from the second pressure sensor;
a second external antenna trace disposed in the second substrate and coupled to the second pressure sensor;
a second RF connector coupled to the second substrate, and disposed externally to the second pressure sensor; and
a first wire connecting the second RF connector to the first RF connector.

23. The pressure sensing system of claim 22, further comprising:
an external system adapted to receive outputs of the pressure sensing system; and
a second wire connecting the first RF connector to the external system, wherein the first RF connector is adapted to transmit, via the second wire, an output of the first pressure sensor to the external system.

24. The pressure sensing system of claim 23, wherein the second pressure sensor is disposed within the first main body.

25. The pressure sensing system of claim 23, further comprising:
a second main body configured to distribute a load between a third member and a fourth member positioned against the third member in the structure, wherein the second main body has an interior and an exterior, wherein the second main body is disposed between the third member and the fourth member, and wherein the first member and the third member are different or same members, and the second member and the fourth member are different or same members, wherein the second pressure sensor is carried in the interior of the second main body.

26. The pressure sensing system according to claim 25, wherein the first main body comprises a first washer, and the second main body comprises a second washer that is different from the first washer.

27. The pressure sensing system according to claim 22, further comprising a first external antenna trace that is external to the first pressure sensor, wherein the first external antenna trace is coupled to the internal antenna trace.

28. The pressure sensing system according to claim 22, wherein the first pressure sensor comprises:
a support body;
a semiconductor die mounted to the support body, the semiconductor die comprising an unsupported middle in the unsupported central region and two supported sides in the peripheral region on either side of the unsupported middle, wherein the two supported sides are mounted on the support body; and
wherein the cavity is enclosed by a bottom surface made of the support body and a top surface made of the unsupported middle of the semiconductor die, wherein the semiconductor die comprises the pressure sensing circuitry disposed in the unsupported middle.

29. The pressure sensing system according to claim 22, further comprising an IC interface coupled to the pressure sensing circuitry, wherein the IC interface comprises a transceiver circuit, and the internal antenna trace is coupled to the transceiver circuit.

* * * * *